United States Patent [19]
Zaltzman et al.

[11] Patent Number: 5,244,099
[45] Date of Patent: * Sep. 14, 1993

[54] APPARATUS AND METHOD FOR IMPROVING DENSITY UNIFORMITY OF A FLUIDIZED BED MEDIUM, AND/OR FOR IMPROVED MATERIAL FLUIDIZED BED SORTING

[75] Inventors: Arthur Zaltzman, Pocatello; Sylvester L. Woodland, Blackfoot, both of Id.

[73] Assignee: Camas International, Inc., Pocatello, Id.

[*] Notice: The portion of the term of this patent subsequent to Jun. 2, 2009 has been disclaimed.

[21] Appl. No.: 764,691

[22] Filed: Sep. 23, 1991

Related U.S. Application Data

[63] Continuation-in-part of Ser. No. 571,136, Aug. 21, 1990, Pat. No. 5,118,409, which is a continuation-in-part of Ser. No. 373,067, Jun. 28, 1989, Pat. No. 5,048,693.

[51] Int. Cl.⁵ ................................................ B03B 5/46
[52] U.S. Cl. .................................... 209/466; 209/486; 209/491; 209/493; 209/496; 209/504; 209/508
[58] Field of Search ............... 209/466, 467, 485, 491, 209/495, 503, 504, 493, 486, 508, 468, 469, 496, 493

[56] References Cited

U.S. PATENT DOCUMENTS

| | | | |
|---|---|---|---|
| 76,331 | 4/1868 | Krom | 209/486 |
| 2,006,119 | 6/1935 | Steinmetzer | 209/466 |
| 2,154,784 | 4/1939 | Stump | 209/486 X |
| 2,273,296 | 2/1942 | Stump | 209/495 X |
| 2,310,894 | 2/1943 | Brusset | 209/467 |
| 2,678,131 | 5/1954 | Dore | 209/466 |
| 3,424,309 | 1/1969 | Binnix | 209/496 X |
| 3,879,284 | 4/1975 | Davies | 209/504 X |
| 4,861,464 | 8/1989 | Zaltzman et al. | 209/493 X |
| 4,865,722 | 9/1989 | Ririe et al. | 209/486 X |
| 5,024,334 | 6/1991 | Misra et al. | 209/491 X |
| 5,048,693 | 9/1991 | Zaltzman | 209/474 X |
| 5,118,409 | 6/1992 | Zaltzman | 209/466 |

FOREIGN PATENT DOCUMENTS

| | | | |
|---|---|---|---|
| 70802 | 5/1942 | Czechoslovakia | 209/468 |
| 715598 | 12/1941 | Fed. Rep. of Germany | 209/468 |
| 909801 | 11/1962 | United Kingdom | 209/496 |

*Primary Examiner*—Donald T. Hajec
*Attorney, Agent, or Firm*—Workman, Nydegger & Jensen

[57] ABSTRACT

An apparatus for providing a fluidized bed to effect the separation of a mixture of articles having at least a first density and a second density that is greater than the first density into separate groups. The apparatus includes an inclined trough which is supplied at an input end with either a fluidization medium, such as sand, or a mixture of articles from which a fluidized bed is formed by forcing gas upwardly through the bottom of the trough and through the fluidization medium or the mixture. In the case where a fluidization medium such as sand is used, the mixture of articles is introduced into the fluidized bed medium so as to be entrained therewith to effect separation as the articles travel in the direction of flow of the fluidized bed medium. Vertical oscillatory movement is imparted to the inclined trough to improve the separation and layering where the mixture of articles is fluidized, or to improve the density uniformity where a fluidization medium such as sand is fluidized as the bed.

57 Claims, 17 Drawing Sheets

APPARATUS AND METHOD FOR IMPROVING DENSITY UNIFORMITY OF A FLUIDIZED BED MEDIUM, AND/OR FOR IMPROVED MATERIAL FLUIDIZED BED SORTING

This application is a continuation-in-part of U.S. patent application Ser. No. 571,136 filed Aug. 21, 1990 U.S. Pat. No. 5,118,409, which is a continuation-in-part of Ser. No. 373,067, Jun. 28, 1989, U.S. Pat. No. 5,048,693.

BACKGROUND OF THE INVENTION

1. Field of the Invention

The present invention relates to methods and apparatus using fluidized bed principles for separating mixtures of articles of different densities, and more particularly to such methods and apparatus as are applicable to the sorting of articles such as, for example, agricultural or other products having small density differences, into several density groups.

2. Background Art

The use of density variation as a means of separating mixtures of articles is widespread. In agriculture, the separation and sorting of produce on this basis is accomplished using both wet and dry methods.

Wet methods use a liquid as a medium with which to separate denser articles, which sink in the given liquid, from the lighter ones that will float thereupon. Dry methods of sorting employ a form of pneumatic separation based on a combination of differing densities and differing aerodynamic properties associated with the components to be sorted.

In one type of dry method (termed material fluidized bed or "FB" method), a gas, such as air, is forced upwardly through a moving bed of the mixture to be separated. This gas flow through the interstices of the particles of the mixture tends to disengage the particles from each other, permitting the gas flow to support at least some of the weight thereof. As a result, the bed of the mixture resembles a liquid of high viscosity, and the particles of the mixture are freed to a degree to migrate within the bed under the influence of physical forces such as gravity that might tend to induce separation among the constituent components.

The separation that occurs when a mixture to be separated is itself fluidized is not one that results exclusively due to differing density among the components of the mixture. Instead, the aerodynamic properties of the particles of the mixture also have a substantial impact upon the rate and quality of the separation that results. The upward flow of gas through the mixture will tend to draw with it the less compact particles of the mixture, regardless of their density.

Separators which pneumatically fluidize the actual mixture to be separated have limited separation effectiveness. While the upper and lower layers of the stratified mixture discharged from the end of the separator trough may be relatively pure, the layers intermediate thereto continue to comprise a mixture of particles of both densities. This precludes the achievement of optimal separation effectiveness.

A second, more profound drawback of FB separation methods in which the mixture to be separated is itself pneumatically fluidized arises because previously fluidization of the mixture has not been practical if the particles of the mixture have diameters greater than approximately one or two millimeters. Thus, such methods have been effective only in separating small products, such as grain cereal, and have not been used to separate or sort larger products.

Accordingly, resort has been made to a second type of dry method (termed a fluidized bed medium or "FBM" method) which is based on the use of fluidized beds which are constituted of a material other than the mixture to be separated. For the purpose of separating mixtures of larger solid bodies of differing densities, a fluidized bed created from such a fluidization medium behaves in a manner analogous to a liquid, but without wetting the articles of the mixture it is used to separate. Pieces of solid material less dense than the apparent density of the fluidized bed will act as a "float fraction" which will float on the surface of the bed. Pieces of solid material which are more dense than the apparent density of the fluidized bed will, on the other hand, act as a "sink fraction" of the mixture which will sink to the bottom of the bed.

For separation to occur, the apparent density of the fluidized bed must be maintained so that it is intermediate the densities of the float and sink fractions of the mixture. Additionally, the particle size of the fluidization medium must be smaller by several orders of magnitude than the size of the bodies contained in the mixture that is to be separated.

Prior to this invention, the use of a fluidization medium other than the mixture to be separated was advantageously used to reduce the influence on the process of other separation factors, such as aerodynamic characteristics, and reduced the process to one in which separation was accomplished substantially on the basis of differing density only. In addition, the presence of a layer of fluidization medium intermediate the float fraction of the mixture on top of the fluidized bed and the sink fraction of the mixture at the bottom thereof permitted a better separation of the float and sink fractions. This was accomplished by separating the upper portion of the fluidized bed with the float fraction entrained therein from the lower portion thereof having the sink fraction entrained therein. Thereafter the two components were cleaned independently to remove any fluidization medium, and close to one hundred percent separation effectiveness between the float and sink fractions of the mixture can be achieved.

While this type of dry method works well for many applications, it still has some limitations. For example, most of the available methods, except a few wet methods, are aimed at separating products with large differences in density (such as clods and stones from potatoes, or plastic particles from copper particles, etc.). Meanwhile, a large variety of sorting applications for various types of products exists wherein the products to be sorted have only small differences in density. Mixtures of such products are commonly found, for example, in agriculture.

Most agricultural products such as fruits and vegetables do not have uniform quality and they do not uniformly mature. Postharvest quality sorting is thus required to supply reliable and uniform quality in the marketplace.

Some of the used techniques for quality sorting are specific to the kinds of produce for which they were developed. In addition, there are no viable methods for sorting numerous other products.

Density may be the most direct and consistent index of maturity and other quality changes. When quality changes are not manifest in external changes, such as differences in size, weight, color, etc., quality sorting with current technology is ineffective. Density may be the sole criterion to permit opportunities for quality sorting in such circumstances. However, quality sorting based on density differences has found limited success in commercial applications for several reasons.

Density changes due to quality transformations in agricultural commodities usually are very small (typically in the range of 0.02-0.04 $g/cm^3$). Effectively detecting and sorting products having these small density differences appears to be possible only in a highly controlled density sorting process. Current density sorting techniques which use liquids such as brine solutions or solutions of alcohol in water to sort sink and float fractions require very close control of the density of such solutions so as to maintain the density intermediate that of the sink and float fractions. This is difficult, particularly as such solutions tend to become contaminated with foreign materials, which affects the solution's density. Thus, frequent changing of the solution may be required, as is preconditioning and post washing operations to reduce contamination and also to remove such liquids from the produce. These operations often deteriorate product quality and storageability. Furthermore, such liquids are expensive, and they may present fire and social hazards when used in large quantities. Some commodities such as peas and blueberries need preliminary prewetting to remove air bubbles. Others, such as peanuts, walnuts, and pecans generally can't be processed in liquids because the absorption of the liquids adversely change mealiness properties. Furthermore, sorting frequently requires grading into three or more categories, which in turn may require several liquid changes.

On the other hand, dry methods of the type noted above are generally limited to sorting mixtures of products wherein there are relatively large density differences between the float and sink fractions. When differences in densities of the products to be sorted are small, such as in the range of differences on the order of 0.02 $g/cm^3$, the density of the fluidized bed, which as noted must be intermediate the sink and float fractions, should differ by only 0.01 $g/cm^3$ from the densities of the products. Maintaining a fluidized bed within such parameters is technically difficult to achieve. Accordingly, what is needed is a method and apparatus for improving the density uniformity of fluidized bed medium (FBM) sorting techniques, and for improving material fluidized bed (FB) sorting techniques, and which eliminates many of the above-noted difficulties. Such an apparatus and method are described and claimed herein.

SUMMARY AND OBJECTS OF THE INVENTION

In view of the present state of the art, one object of the present invention is to provide an improved method and apparatus for efficiently separating and sorting a mixture of articles, as for example agricultural products, when the articles are to be sorted into several different groups based on small density differences.

Another object of the invention is to provide an improved method and apparatus for sorting articles of small density differences into several groups utilizing an improved FB or FBM process.

A further object is to provide a method and apparatus wherein the density uniformity of a fluidized bed medium is improved so as to permit improved separation of a mixture of articles having small density differences which are entrained in the fluidized bed to form sink and/or float fractions.

Still another object of the present invention is to provide a method and apparatus for improving separation of articles with small density differences into several groups utilizing a fluidized bed formed from a mixture of the articles to be separated, and wherein the size of the articles may be significantly larger than 1-2 mm, such as peanuts, beans or corn.

The foregoing and other objects and advantages of the invention will become more apparent from the following detailed description, or may be learned by the practice of the invention.

In accordance with the invention as embodied and broadly described herein, in one presently preferred embodiment a mixture comprised of articles having small density differences is supplied to an inclined trough at an input end of the trough. A fluidizing gas such as air is forced from the bottom of the trough through the mixture of articles so as to create therefrom a material fluidized bed which flows through the inclined trough under the influence of gravity to an output end of the trough. Preferably the trough is wider and more shallow at the input end thereof and becomes narrower and more deep at the output end. A vertical oscillation is imparted to the trough which advantageously increases the effective separation of the various components of the mixture while the mixture is moving in the direction of the fluidized bed flow. Less dense components of the mixture rise to the surface of the fluidized bed whereas the more dense components form one or more layers beneath the least dense components, forming a layered effect as the fluidized bed becomes deeper toward the output end of the inclined trough. At the output end of the trough the various layers are separated one from the other, for example by a stream splitter, and are loaded onto different conveyors.

In another embodiment of the invention, one or more of the layers may be conveyed to one or more similar inclined troughs where further separation of the conveyed portion or layers occurs by further fluidization of that portion of the mixture.

In yet a further embodiment of the apparatus and method of the present invention, the fluidized bed is formed from a medium such as sand and the mixture of articles which is to be separated based on small density differences into various density groups is introduced into the input end of the trough so that the mixture of articles is entrained in the fluidized bed medium. As in the case of the previous embodiment, a vertical oscillation is imparted to the inclined trough which advantageously improves the density uniformity of the fluidized bed medium so as to more effectively maintain the fluidized bed medium at a density which is intermediate the least and most dense articles of the mixture which are to be separated.

In still a further embodiment of the apparatus and method of the present invention, the mixture of articles which is to be separated based on small density differences may be introduced into the fluidized bed medium at a selected depth and permitted to ascend so that the articles of differing densities will become spatially separated as they become entrained and travel in the direction of the flow of the fluidized bed while ascending to the top thereof. Articles having less density will ascend faster whereas articles having increased density will ascend more slowly thus tending to affect the spatial separation at the surface. As in the case of the other embodiments, vertical oscillation is preferably imparted to the trough so as to improve the density uniformity of the fluidized bed.

BRIEF DESCRIPTION OF THE DRAWINGS

A more particular description of the invention briefly summarized above will be rendered by reference to the specific embodiments thereof which are illustrated in the appended drawings, in which like parts are designated by like numerals. Understanding that these drawings depict only typical embodiments of the invention as represented, for example, by the currently understood best mode for practicing the invention, the drawings are therefore not to be considered limiting of its scope. The invention will thus be described with additional specificity and detail through the use of the following drawings in which.

DESCRIPTION OF THE PREFERRED EMBODIMENTS

Figure 1:
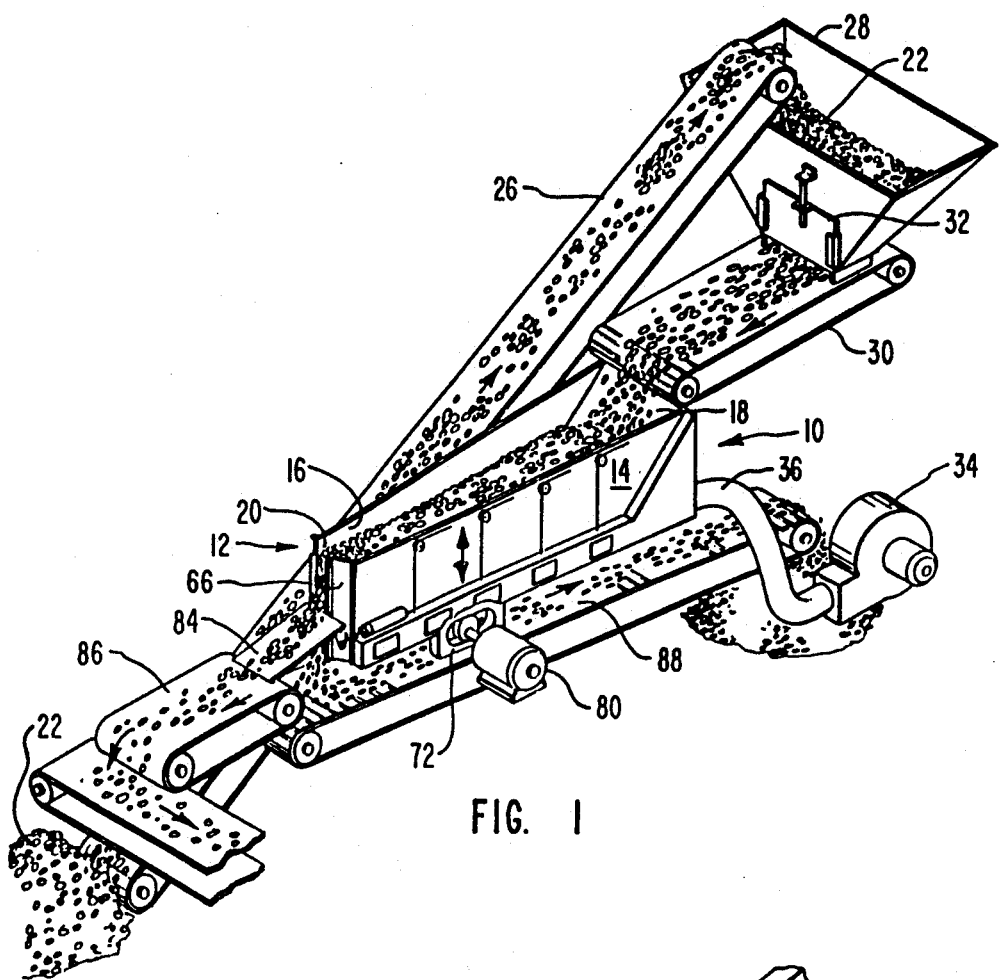
FIG. 1 is a perspective view in schematic form of one embodiment of an apparatus and method incorporating the teachings of the present invention.
Figure 7:
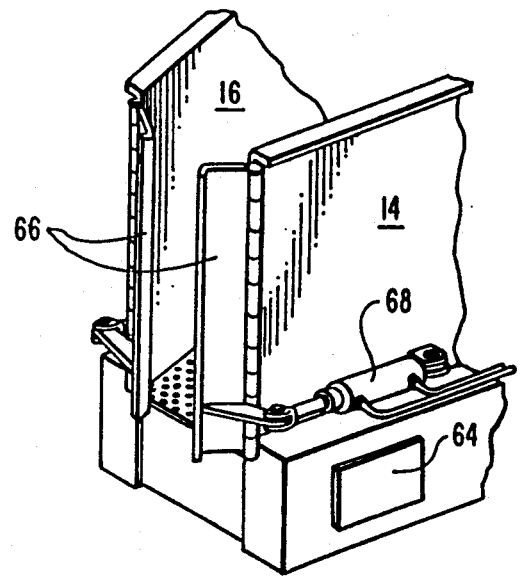
FIG. 7 is an enlarged perspective view of the output end of the trough of FIG. 1.
Figure 2:
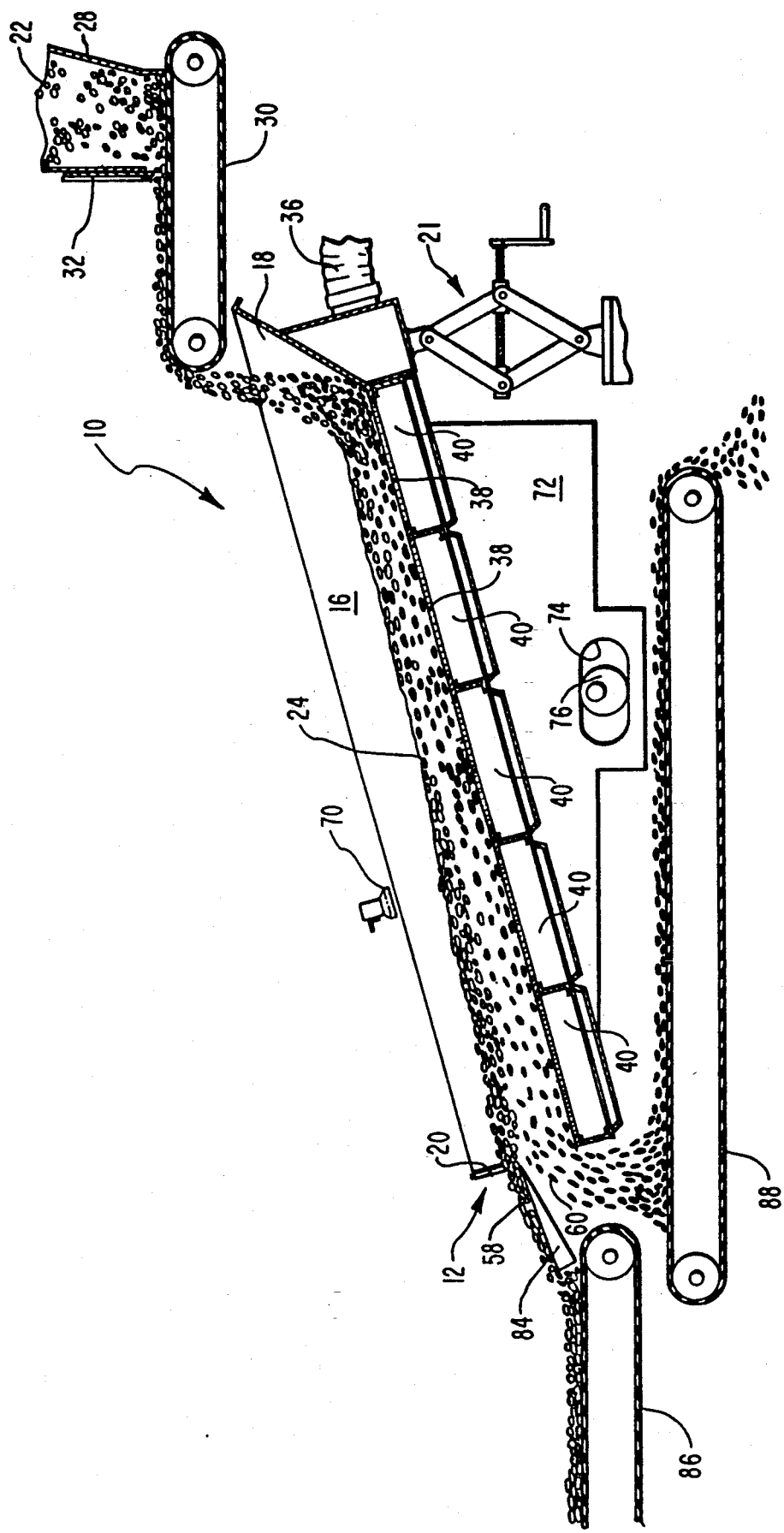
FIG. 2 is a longitudinal cross-sectional view of the apparatus of FIG. 1.

FIGS. 1 and 2 taken together depict one embodiment of a separator 10 incorporating teachings of the present invention For the sake of simplicity, supporting structure, such as frames, braces, and adjustment mechanisms for the functional components of separator 10 have been largely eliminated in FIG. 1 and FIG. 2. Also, deleted totally from the figures are power sources and drive mechanisms for the several conveyors shown, these being adequate to the purposes of the present invention if of a conventional nature.

In accordance with one aspect of the present invention, separator 10 includes a channelization means having input and output ends for containing a material fluidized bed flowing under the influence of gravity from the input to the output end thereof. As shown by way of example and not limitation, an open trough 12 having upright sidewalls 14, 16 is inclined downwardly from a closed input end 18 to an open output end 20. A mixture of articles 22 is fed into input end 18 of trough 12 and fluidized pneumatically in a manner to be described hereafter to create a fluidized bed 24, shown in FIG. 2.

Due to the incline of trough 12, fluidized bed 24 flows through trough 12 toward output end 20 under the influence of gravity. In order to influence the rate of flow of fluidized bed 24, the steepness of the incline of trough 12 may be rendered adjustable. This may be accomplished by supporting input end 18 of trough 12 on a suitable pivot while output end 20 of trough 12 is in turn upheld by a suitable means for raising and lowering output end 20, such as a scissor jack 21, as shown best in FIG. 2.

Figure 3:
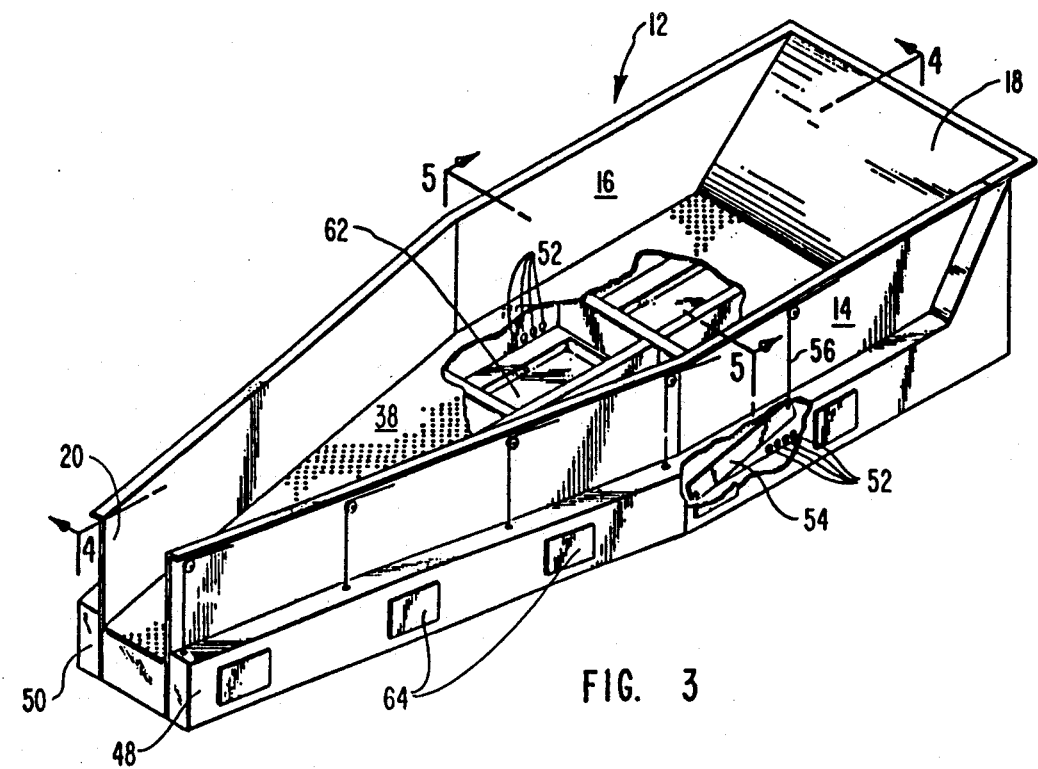
FIG. 3 is a perspective, partial cut-away view of the trough of the separator of FIG. 1.
Figure 4:
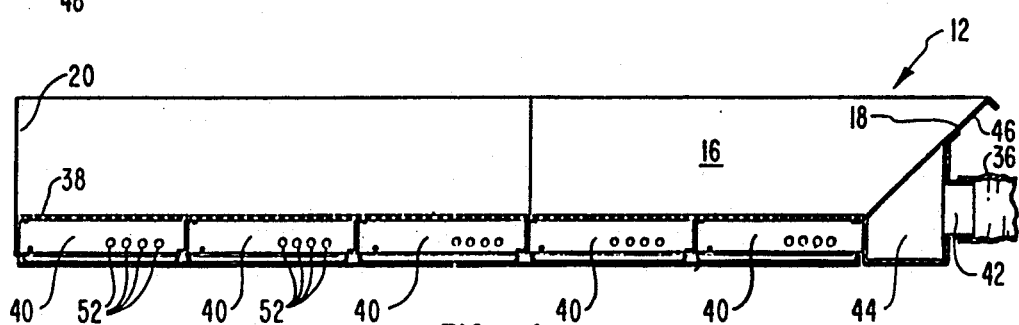
FIG. 4 is a cross-sectional elevation view of the trough at FIG. 3 taken along section line 4—4 shown therein.
Figure 5:
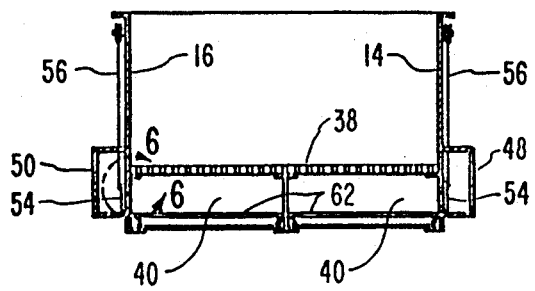
FIG. 5 is a transverse cross-sectional view of the trough of FIG. 3 taken along section line 5—5 shown therein.
Figure 6:
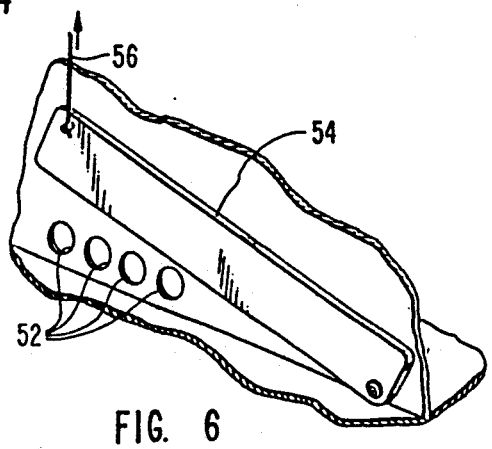
FIG. 6 is an enlarged perspective view of an air control mechanism used in the trough of the separator illustrated in FIG. 1.

As best seen in FIG. 3, the horizontal separation between sidewalls 14, 16 of trough 12 decreases toward output end 20 thereof. As a result, fluidized bed 24 flowing through trough 12 increases in depth along the direction of its flow, advantageously enlarging the distance between the bottom and top thereof. The degree of increase in the depth of fluidized bed 24 at output end 20 of trough 12 is a function of the degree of horizontal separation between sidewalls 14, 16. As a result, it would be appropriate to make sidewalls 14, 16 taller at output end 20 of trough 12 than at input end 18.

Separator 10 is also comprised of a medium feed means for supplying to the input end 18 of trough 12 a fluidization medium from which to create the fluidized bed in the trough. As shown by way of illustration, the medium feed means in the embodiment of FIG. 1 is comprised of a first conveyor 26, a collector bin 28 located at the end of conveyor 26 and a second conveyor 30 which carries the fluidization medium or in the case of the embodiment of FIG. 1 the mixture 22 from bin 28 to the input end 18 of trough 12. The collector bin 28 is provided with an adjustable gate 32 which controls the amount of fluidization medium or mixture 22 introduced onto the conveyor 30. Adjustable gate 32 in combination with conveyor 30 thus serves as a metering means for regulating the rate of supply of fluidization medium to the input end 18 of trough 12.

Separator 10 is also comprised of a pneumatic means for forcing gas upwardly through the fluidization medium in trough 12 to create therefrom a fluidized bed. As already noted, in the case of the embodiment of FIG. 1, the fluidized bed is created from the mixture of articles 22 by directly fluidizing the mixture. The creation of fluidized bed 24 from the mixture 22 through utilization of the pneumatic means is best understood in relation to FIGS. 1–7 taken together.

The bottom of trough 12 comprises an air distribution plate 38 which may be a high density perforated polyethylene plate or porous metal sheet. For the purposes of separator 10, air distribution plate 38 could be designed with an average opening of from 30 microns and a flow rate of 50 standard cubic feet per minute (where particles as fine as sand are fluidized) to 70 microns and a flow rate of 600 standard cubic feet per minute (for particles as large as peanuts). Ambient air is directed through air distribution plate 38 and forced upwardly through the mixture 22 by means of blower 34 and air duct 36.

Figure 13:
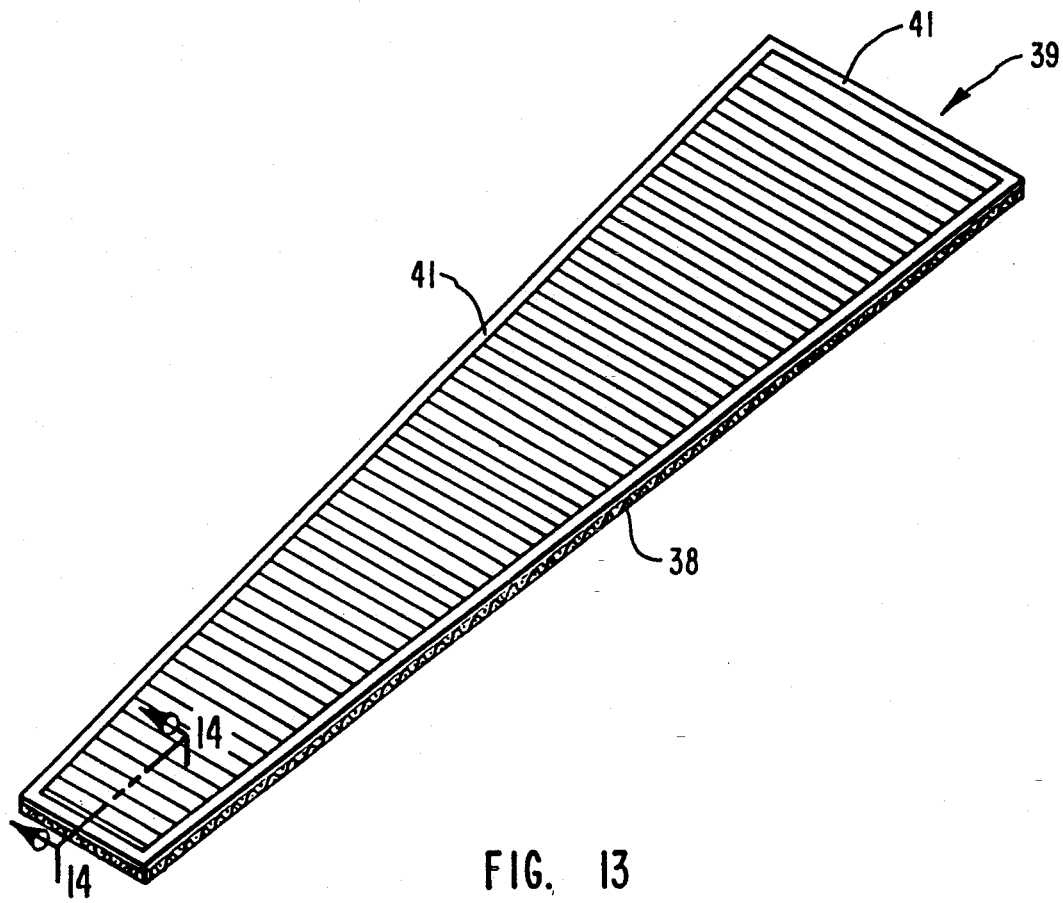
FIG. 13 is a perspective view that schematically illustrates an alternative form of a porous plate which can be used for fluidization of the fluidized bed.
Figure 14:
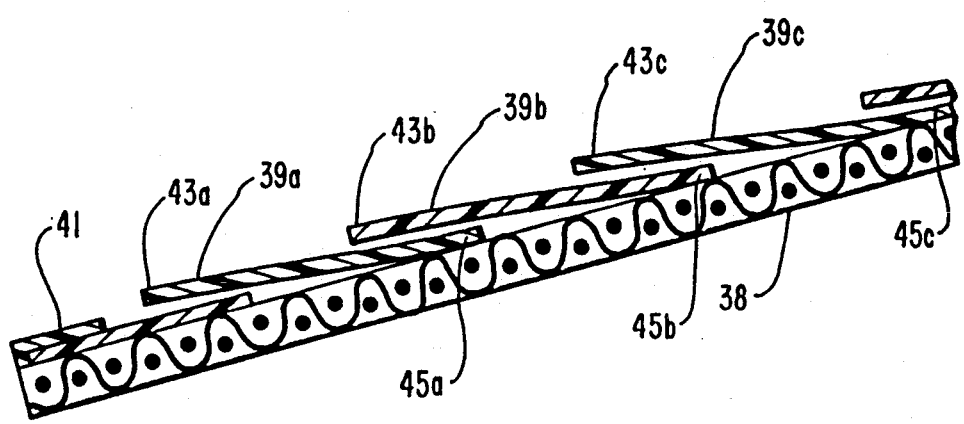
FIG. 14 is an enlarged cross-sectional view taken along lines 14—14 of FIG. 13 so as to more particularly illustrate the structure of the porous plate.

An alternative embodiment of the air distribution plate 38 is illustrated in FIGS. 13 and 14 taken together. As shown best in the enlarged cross-sectional view of FIG. 14, the upper surface of the porous plate 38 is covered with a plurality of very thin flaps which are indicated at 39a–39c. Each flap has one end thereof, as designated at 45a–45c, secured to the upper surface of the porous plate 38. The opposite end of each flap, as designated at 43a–43c, is free and slightly overlaps the secured end of an adjacent flap. A band 41 is secured around the periphery of the upper surface of the porous plate 38 to further secure the edges of each of the flaps 39.

With further reference to FIG. 14, by means of this arrangement gas can be forced upwardly through the porous plate and will then escape out from under the free end 43 of each flap 39. The flaps 39 are extremely thin sheets of material, as for example aluminum. This particular configuration of the air distribution plate has the advantage that it prevents clogging of the porous openings of the plate 38 when sorting products which tend to be oily, as for example peanuts.

From air duct 36 air enters a series of chambers 40 (see FIG. 4) below trough 12 and air distribution plate 38 through an orifice 42 of an air receiving chamber 44 beneath inclined end wall 46. The air then divides and passes on either side of trough 12 through rectangular air plenums 48, 50 which extend the full length of trough 12 on opposite sides thereof (see FIGS. 3 and 5). Below air distribution plate 38 the gas pressure chambers 40 each open into one or the other of air plenums 48, 50 through a plurality of circular air intake openings 52. Air under pressure in air plenums 48, 50 thus passes through air intake openings 52 into gas pressure chambers 40 and is forced upwardly through air distribution plate 38 and mixture 22 thereabove to create fluidized bed 24.

Each set of air intake openings 52 is adjustably occludable by a pivoted air pressure control plate 54 (see FIG. 3) which may be raised and lowered by a control cable 56 attached to one end thereof. Ultimately such occlusion impacts the effective density of fluidized bed 24 above each individual air pressure chamber 40. Partially covering intake openings 52 by lowering the pressure control plate 54 reduces the air pressure in the associated air pressure chamber 40 in relation to that existing in air plenums 48, 50. Thus, air intake openings 52 in combination with air pressure control plates 54 serve as air pressure reducing valves for each of air pressure chambers 40.

The narrowing of sidewalls 14, 16 toward the output end 20 of trough 12 causes the depth of fluidized bed 24 to increase in the direction of its flow. This is desirable for efficient separation of mixture 22 into its constituent groups. Increasing the depth of the fluidized bed 24 thus enhances separation by causing better layering, as illustrated at 58 and 60 in FIG. 2.

A shallow fluidized bed requires less air flow to achieve the same effective density than does a deeper one. Decreased air flow in the shallower portions of fluidized bed 24 is therefore utilized. The air pressure in each of air pressure chambers 40 immediately below air distribution plate 38 is individually adjusted toward that end by manipulating air pressure plates 54. The air in air pressure chambers 40 is thereby graduated so that the pressure of the air in each decreases corresponding to the distance of each air pressure chamber 40 along distribution plate 38 from output end 18 of trough 12. This adjustment of air pressure is intended to correspond roughly to the variation in the depth of fluidized bed 24 along the length of trough 12.

The lower portion of each gas pressure chamber 40 is provided with a cleanout hatch 62 to facilitate maintenance, while the outer walls of air plenums 48, 50 at each air pressure control plate 54 are provided with access hatches 64 (FIG. 3) to permit servicing of the pneumatic system at those locations.

It has been found that for some combinations of proportions (e.g., narrowing of the trough, length etc.) and for some degrees of inclinations of a channelization means, such as trough 12, the establishment of an adequately deep fluidized bed 24 does not occur. Thus, in accordance with the present invention a fluidized bed separator, such as separator 10, is provided with restriction means for assisting the establishment of fluidized bed 24 by temporarily retarding the flow of fluidized bed 24 at output end 20 of trough 12 without substantially changing the volume of trough 12.

As shown herein by way of example and not limitation an obstruction is provided which is selectively interposable into the flow of fluidized bed 24 at output end 20 of trough 12. In one embodiment of the restriction means of the present invention shown in FIGS. 1 and 7, such an obstruction takes the form of a plurality of damper plates, or a damper plate or plates that are vertically movable, such as plates 66. Damper plates 66 are pivotable about a vertical axis and actuable, for example, by hydraulic or electrical controls 68. In another embodiment the restriction means take the form of damper 123 of FIG. 10.

The additional resistance to the outflow of fluidized bed 24 from output end 20 of trough 12 causes fluidized bed 24 to rise. Once an acceptable depth is achieved, damper plates 66 are pivoted to mitigate or eliminate totally such restriction to flow. It is also important that damper plates 66 not be extensive enough to completely close off output end 20 of trough 12.

Once established, it is desirable to maintain fluidized bed 24 at an essentially constant depth. This stability, however, is repeatedly disrupted through the addition to fluidized bed 24 of mixture 22 from mixture conveyor 30. In accordance with the present invention, control means are thus provided for sensing the depth of fluidized bed 24 and based thereon for controlling the rate at which conveyor 30 and gate 32 supply fluidization medium 22 to input end 18 of trough 12. In this manner the depth of fluidized bed 24 can be maintained automatically at a preselected value. As shown by way of example and not limitation, one form of such a control means can take the form of an ultrasonic sensor 70 (FIG. 2) mounted above trough 12 to detect the distance of the top surface of fluidized bed 24 therefrom. Cylindrical ultrasonic proximity sensors, such as those among the Series PCU Ultrasonic Proximity Sensors marketed by Agastat Corporation, will function adequately for this purpose. Signals from ultrasonic sensor 70 then are used to control the drive means employed in relation to feed conveyor 30 and/or gate 32.

In accordance with another aspect of the present invention, separator 10 also comprises a vertical oscillation means for imparting to trough 12 a vertical oscillatory movement of selected frequency and amplitude. As shown best in FIGS. 1, 2 and 8 taken together, and as illustrated by way of example and not limitation, the vertical oscillation means may comprise a slotted, wedge-shaped support member 72 (see FIG. 2) which is attached to the bottom of and which supports the trough 12. Support member 72 is provided with a slot 74 which, as hereinafter described in further detail, cooperates with a cam and shaft, shown best in FIG. 8, to impart the described vertical oscillatory motion to the trough 12.

Figure 8:
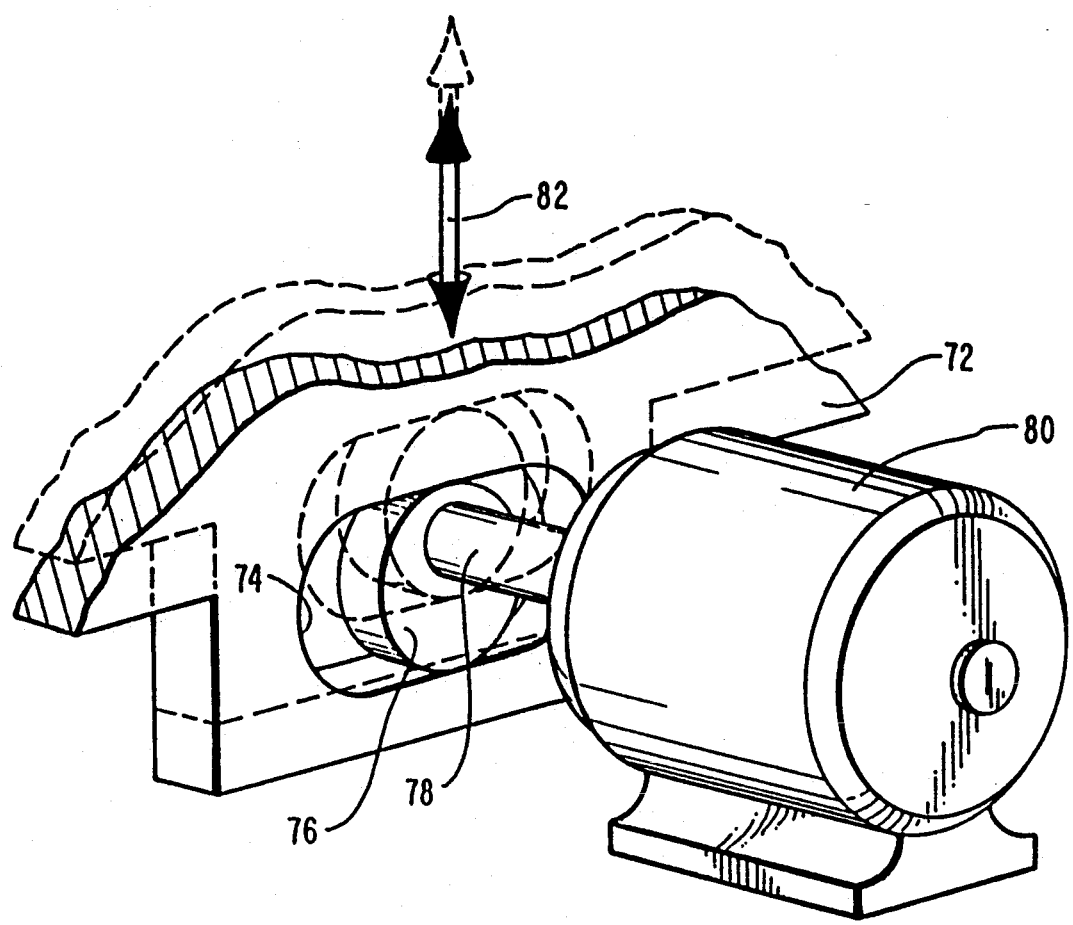
FIG. 8 is an enlarged perspective view of a portion of the inclined trough of FIG. 1 which more particularly illustrates the apparatus and method for imparting vertical oscillatory motion to the inclined trough.

The manner in which the cam member 76 and shaft 78 impart the vertical oscillatory motion is schematically indicated in FIG. 8 by the dashed line representation and is schematically illustrated by the arrow 82. As shown best in FIG. 8, a drive means such as an electric motor 80 drives shaft 78 which in turn is connected to a cam member 76 situated in the slot 74. The length of the slot 74 is such that as the shaft 78 rotates the off-centered cam member 76, the length of the opening of slot 74 is designed so that practically no horizontal component of motion is imparted to the support member 72. On the other hand the off-centered shaft 78 and cam member 76 will impart an up and down or vertical oscillatory motion to the support member 72. Other instruments and combinations for providing the described vertical oscillatory motion may also be devised and are intended to be within the scope of the apparatus and method of the invention, as further illustrated and described for example in connection with FIG. 9.

Importantly, the vertical oscillatory motion substantially improves the separation of mixture 22 as it is fluidized so that improved layering results and hence improved separation at the output end of trough 12. It is important to note that essentially only vertical oscillatory motion is imparted to the trough 12, and there is no attempt to cause the articles of the mixture to move horizontally but only vertically. Horizontal movement is intended to be effected solely by the influence of gravity as the mixture 22 is fluidized and flows down the inclined trough 12.

In accordance with the presently understood best mode of the invention, it has been found that the frequency of vibration and amplitude for sorting purposes should preferably be selected such that the articles of mixture 22 will be subjected to from 3 to 12 g (approximately 29–118 m/s$^2$) depending upon the characteristics and size of the product being sorted. Importantly, the improved fluidization which results from such vertical oscillatory motion which is imparted to trough 12 permits material fluidized bed processes to be utilized with products which are substantially larger than 1 to 2 mm, such as peanuts, beans and corn and other similar kinds of larger articles requiring sorting based on small density differences for purposes of rating quality, ripeness or other such characteristics of such products.

Figure 15:
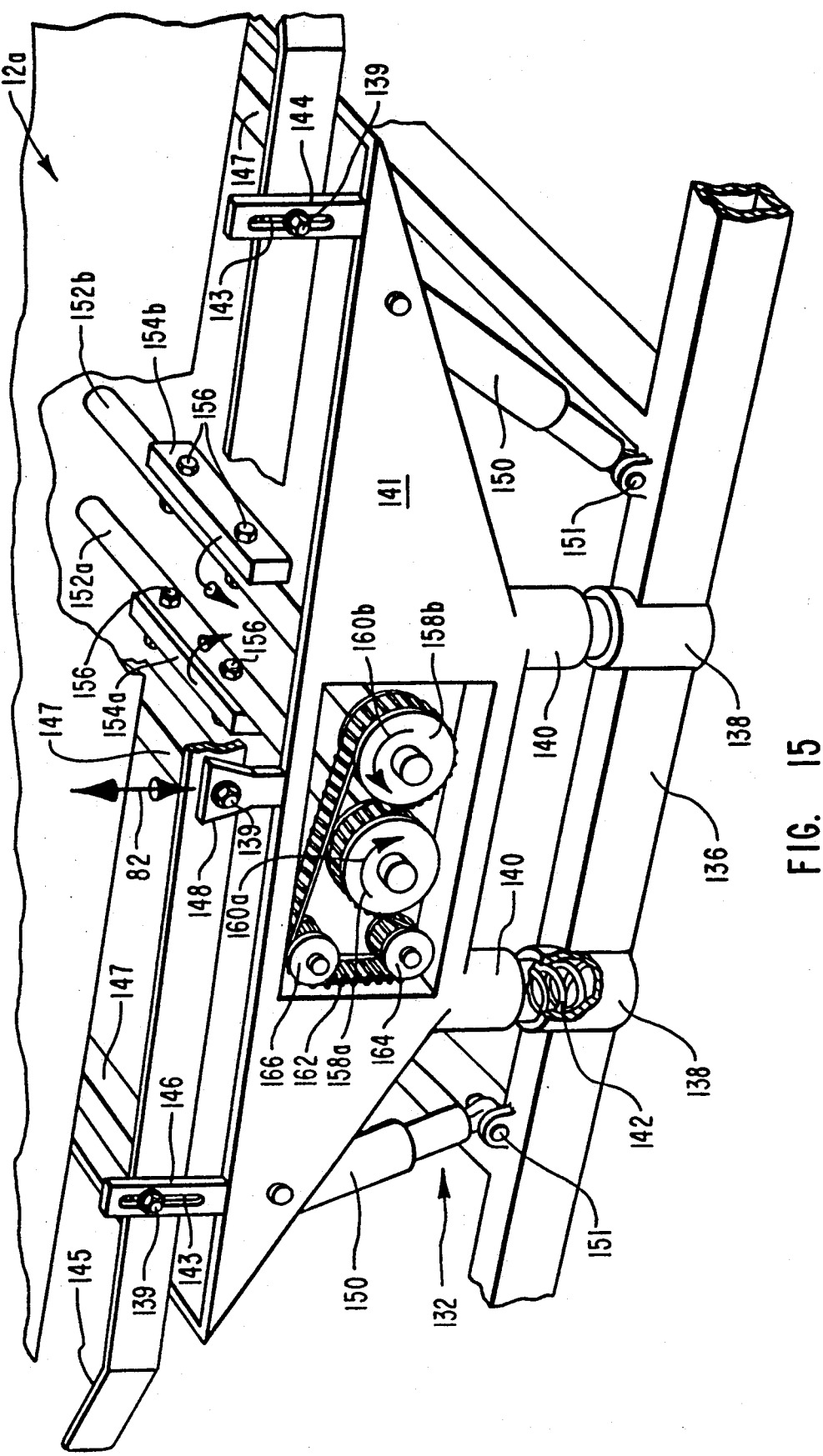
FIG. 15 is an enlarged perspective view of an alternative form of the mechanism for imparting vertical oscillation to an inclined channel.

FIG. 15 schematically illustrates another presently preferred embodiment of a vertical oscillation means for imparting vertical oscillatory movement of selected frequency and amplitude to an inclined trough. With reference to FIG. 15, a vertical oscillation means is generally designated at 132, and may comprise a supporting framework 136 which carries the overall assembly of the vertical oscillation means. The framework 136 has cylindrical wells 138 at opposite sides of the framework 136. Each of the cylindrical wells 138 has placed therein a spring 142, as shown in the partial broken away portion in FIG. 15. A platform 141 is supported by depending legs 140 which are mounted in the cylindrical wells 138 and are carried by the springs 142. It will therefore be appreciated that the platform 141 is spring-mounted to the supporting framework 136 so that the entire platform 141 can be subjected to the desired vertical oscillatory movement.

The opposite ends of platform 141 are further supported by shock absorbing pistons 150 which are also attached at pivot points 151 to the supporting framework 136. The shock absorbing pistons 150 advantageously reduce second and higher order harmonic oscillation and tend to significantly reduce or eliminate unwanted rocking motion at the ends of the platform 141. Thus, in this manner the platform 141 is stabilized so to produce essentially only a vertical oscillatory movement with substantially no significant horizontal or rocking movement being imparted to the platform 141.

Securely attached as by welding to the upper edges of the platform 141 are brackets 144 which have slots 143 therein. By means of the slots 143, an upper supporting framework 145 can be adjusted and then secured by means of the bolts 139. The upper supporting framework 145 is used to support and carry the trough generally designated 12a (with portions thereof shown broken away), which is firmly attached by means of welding or other appropriate attachment to the cross bars 147 of the upper supporting framework 145. Bracket 148 at the center of the platform 141 is also securely attached as by means of a bolt 139 to provide further support to trough 12a at the middle of the upper supporting framework 145. As will therefore be appreciated, as the platform 141 moves up and down in a vertical oscillatory movement, the vertical oscillations are in turn imparted to the supporting framework 145 and to the trough 12a which is carried on the framework 145.

In the embodiment of FIG. 15, the mechanism for imparting the vertical oscillatory movement to the platform 141, upper supporting framework 145 and trough 12a is comprised of two axles 152a and 152b. Mounted on each axle 152 is an eccentric weight 154a and 154b, respectively. These eccentric weights 154 are removably mounted to the axles 152 by means of the bolts 156. Accordingly, weights of various sizes can be attached to the axles 152 in order to adjust the therefore be increased as the eccentric weights 154 are increased in size and weight, whereas the amplitude of the vertical oscillations will be decreased as the size of the eccentric weights is decreased.

Importantly, it should be noted that the eccentric weights 154a and 154b are mounted to the axles 152 so that they will be 180° out of phase with each other as the axles 152 are rotated. Further, as will be seen from the sprocket mechanisms which drive the two axles 152a and 152b, the two axles are rotated in opposite directions. Since both axles 152a and 152b are rotated means of the sprockets 158a and 158b, both axles will be driven at the same speed. The result is that the two weights 154a and 154b will tend to counter-balance each other with respect to any horizontal component of movement and will therefore maximize movement in the vertical direction only.

The sprocket mechanisms which drive the two axles 152 are comprised of the two sprockets 158a and 158b which are counter-wound by the belt 162 so that those two sprockets will rotate in opposite directions as schematically represented by arrows 160a and 160b. The sprockets 164 and 166 are used to provide the appropriate tension and support needed in connection with the drive mechanism. The sprockets 158a and 158b can be driven by any appropriate means, as for example a conventional electrical motor and the speed of the motor and hence sprockets 158a and 158b should be variable so that the controlled and adjusted as desired. Accordingly, for products which have a larger size the magnitude of the vertical oscillations will need to be increased and the frequency decreased, whereas for smaller sized particles the desired vertical oscillations should have a higher frequency and a smaller magnitude. This advantageously permits increased flexibility of the vertical oscillation means for use with a wide variety of different kinds of products which are to be separated when using material fluidized bed sorting principles.

Once again, as in the case of the previously described embodiments, the means for vertical oscillation as illustrated in FIG. 15 imparts substantially only vertical oscillatory movement, as schematically represented by the arrows 82 with no significant horizontal or rocking motion being imparted to the trough 12a.

The operation of the fluidized bed 24 to separate the articles of mixture 22 is best understood in relation to FIG. 2. The mixture of articles 22 is supplied on conveyor 30 to the input end 18 of trough 12 as described above. The mixture 22 is then fluidized by means of air which, as previously described, is forced through the air plenums 48 and 50 and through the air chambers 40 and gas distribution plate 38 with the air pressures progressively increasing in the chambers 40 as the fluidized bed deepens as it approaches the output end 20 of trough 12. As the mixture 22 is fluidized and flows down the trough under the influence of gravity, a vertical oscillatory motion is also imparted to the trough 12 by means of the wedge-shaped support member 72 and the cam member 76 as previously described in conjunction with FIGS. 1 and 8, or by the vertical oscillation means as described in FIG. 15. As noted above, the vertical oscillation substantially aids in separation and layering of the articles of mixture 22 as the fluidized bed 24 is formed and flows through trough 12 so that articles 58 which are of lesser density form a separate layer from articles having a greater density, such as illustrated for example at 60. A stream splitter 84 in conjunction with conveyors 86 and 88 serve to form a means for off-loading the different layers 58 and 60 which are vertically separated at the output end of the inclined trough 12.

Figure 9:
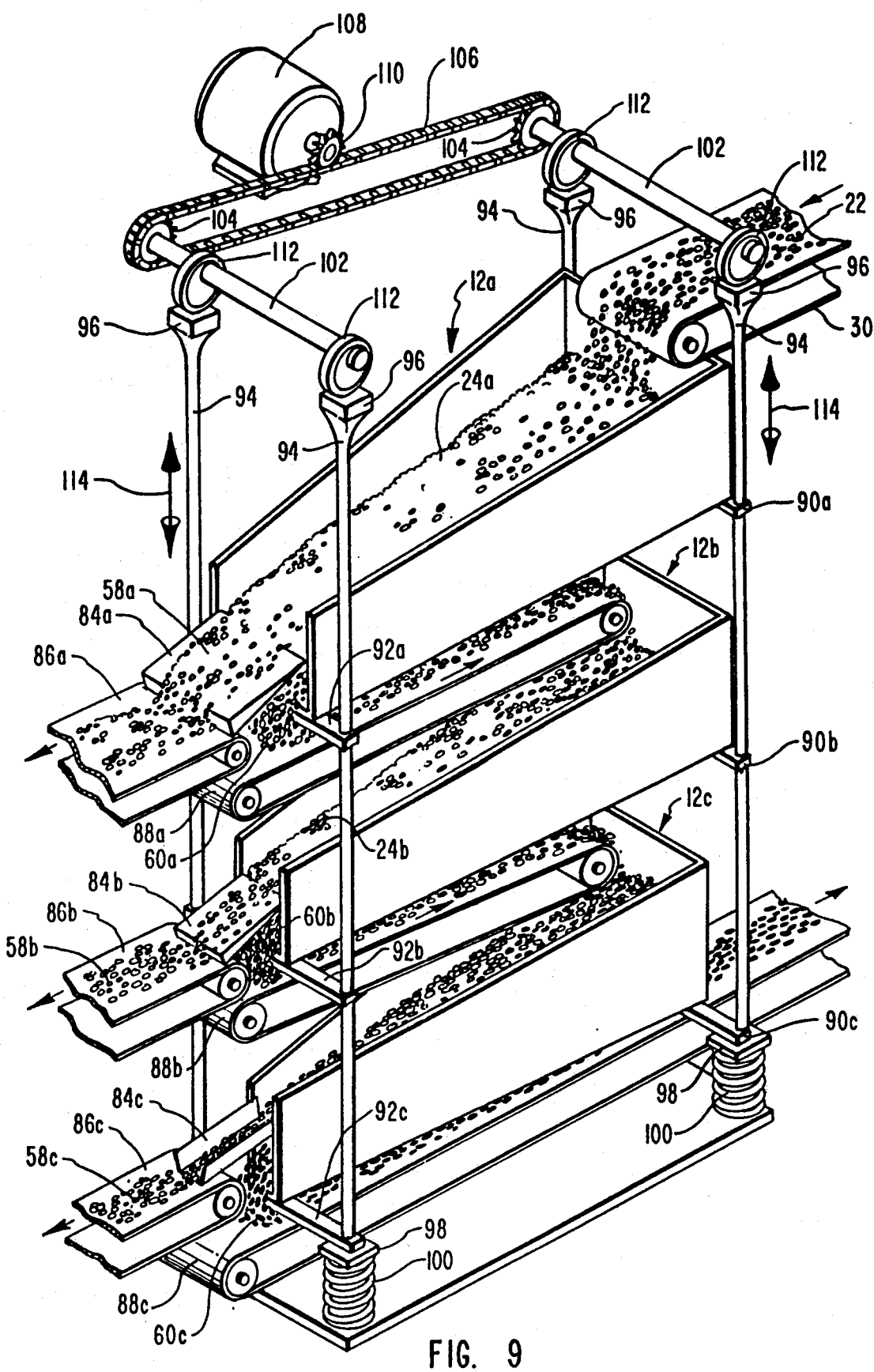
FIG. 9 is a perspective view illustrated in a schematic format which illustrates use of a plurality of separators which are each vertically oscillated and which are used for consecutive fluidization and further separation of a portion of the mixture of articles which is fluidized to effect further separation of one or more layers of the articles contained in the mixture.

FIG. 9 schematically illustrates a further embodiment which incorporates the teachings of the apparatus and method of the present invention to effect further separation of a mixture of articles from which a fluidized bed is formed by taking a portion of the separated articles and processing that portion consecutively through a plurality of troughs. As shown in FIG. 9, three inclined troughs generally designated at 12a–12c are stacked one above the other. For ease of illustration, each of the inclined troughs 12a–12c have been schematically represented and do not show the pneumatic means and the other detail as previously described in conjunction with the trough 12 of FIGS. 1–7, but it is to be understood that each of the troughs 12a–12c would typically comprise the additional detail and structure as described in connection with trough 12 in the embodiment of FIG. 1.

Each of the three inclined troughs 12a–12c are provided with horizontal support members 90a–90c and 92a–92c at the input and output ends of each trough. Support members 90a–90c are preferably provided with a means for adjusting the angle of inclination of each trough 12a–12c, such as a scissors jack (see FIG. 1). Alternatively, support members 90a–90c could themselves be adjustable on rods 94. Thus, in some cases it may be desireable to have different angles of inclination for each trough 12a–12c. The troughs 12a–12c could also be arranged horizontally as opposed to vertically, and such is also intended to be within the scope of the invention.

Attached to each horizontal support member 90 and 92 are vertical rods 94 which are provided with platform-like members 96 and 98 at the top and bottom of each rod 94. The platform 98 which is positioned at the bottom of each rod 94 is situated on a spring 100 whereas the top platform 96 is in contact with a cam member 112 which in turn is rotated by a shaft 102. Each shaft 102 is driven by a chain 106 and sprockets 104 positioned on the ends of shafts 102 so that as the motor 108 drives sprocket 110 the chain 106 is driven, in turn driving the shaft sprockets 104 and shafts 102. The rotational movement of each cam member 112 will in turn impart a vertical oscillatory movement of selected amplitude and frequency as schematically represented by arrows 114 to each of the inclined troughs 12a–12c, and as noted previously.

In the operation of the apparatus and method as illustrated in FIG. 9, the mixture of articles 22 is input from conveyor 30 to the input end of the upper trough 12a and is fluidized in the manner previously described to form a fluidized bed 24a. At the output end of trough 12a the fluidized bed 24a is layered so that articles 58a of lesser density will be separated and can thus be off-loaded by means of the stream splitter 84a and corresponding conveyor 86a, whereas the articles having a greater density such as illustrated at 60a will be off-loaded onto conveyor 88a. Conveyor 88a in turn will introduce that portion of the mixture of articles into the input end of trough 12b so as to form fluidized bed 24b in order to effect a further separation at the output end of trough 12b. A still further separation may be employed if desired by returning a further portion of the mixture of articles by means of conveyor 88B to the input end of trough 12c.

Alternatively, in some cases it will be desireable to subject the layer of less dense articles 58a and 58b for further separation, as in the case of separating peanuts contaminated by aflatoxin. Accordingly, consecutive processing of either portion of the mixture (e.g., layers 58 or 60) is intended to be within the scope of the invention.

As will be appreciated from the above description, vertical oscillatory motion of the same selected frequency and amplitude is imparted to each of the troughs 12a-12c so as to advantageously improve the layering and hence separation which occurs at the output end of the respective troughs 12a-12c. Accordingly, at the output end of the lower-most trough 12c, virtually complete separation between the articles of different density, as illustrated 58c and 60c, will have been accomplished by means of the recirculation of a portion of the mixture of articles from one trough to the other.

Figure 16:
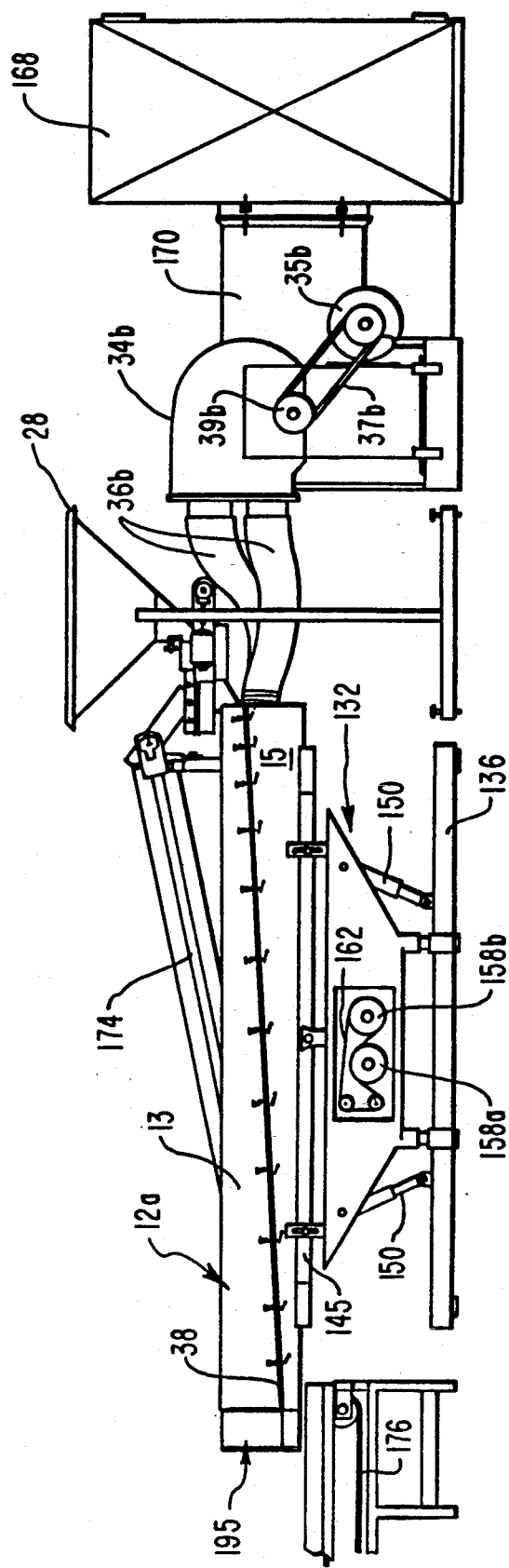
FIG. 16 is a side view of another embodiment of the invention which utilizes a plurality of inclined channels and which includes an additional inclined channel for effecting separation based on size of the articles.
Figure 17:
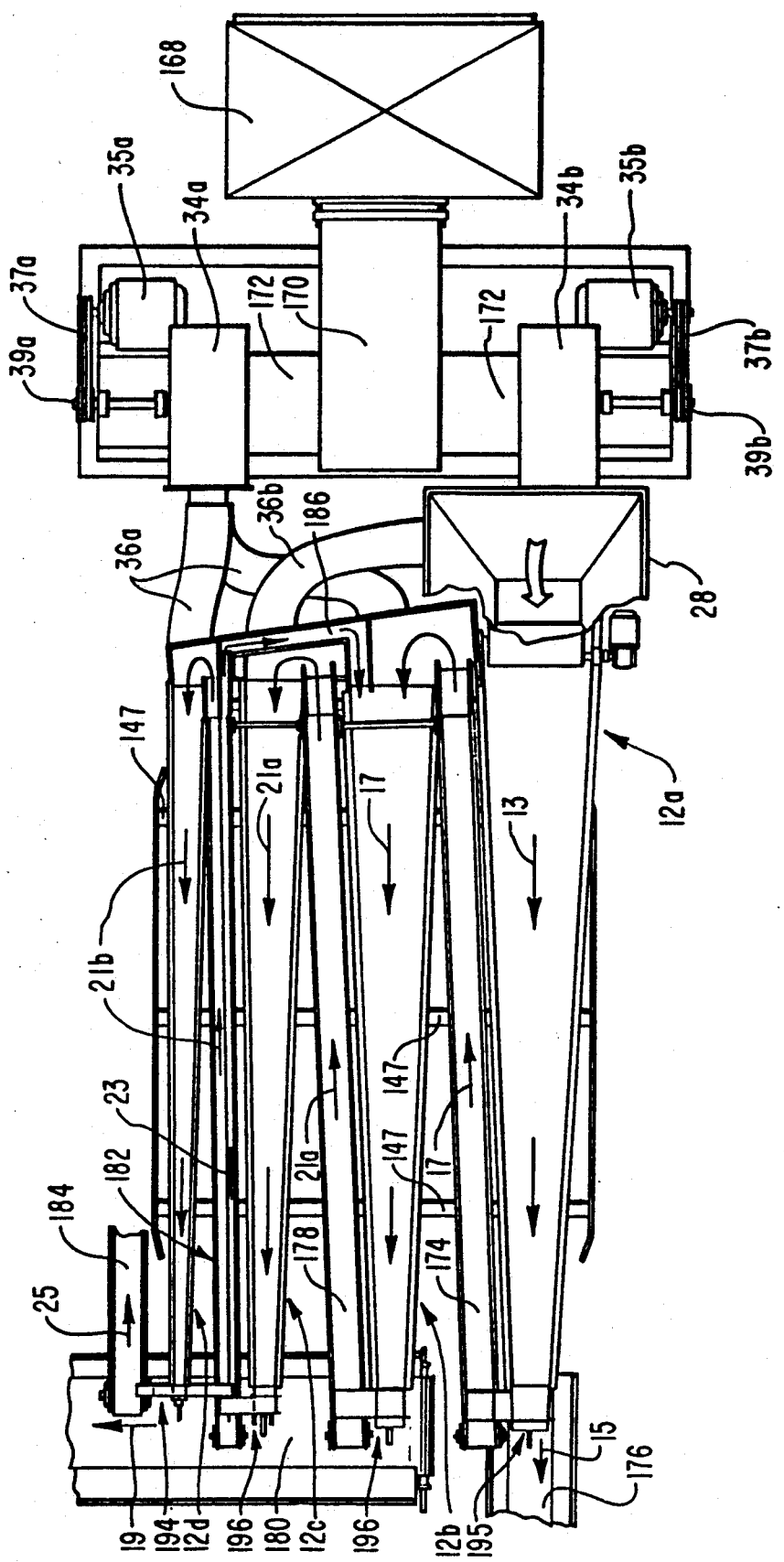
FIG. 17 is a top view of the embodiment of FIG. 16, which more particularly illustrates the plurality of channels.

FIGS. 16 and 17 taken together schematically illustrate yet a further embodiment which incorporates the teachings of the apparatus and method of the present invention to effect separation of a mixture of articles from which a fluidized bed is formed by taking a portion of the separated articles and processing that portion consecutively through a series of troughs, similar to the manner described in FIG. 9.

As shown best in FIG. 17, in this embodiment there are four troughs 12a-12d which are essentially identical except for the width of each trough from the inlet end to the outlet end. The troughs become successively smaller because successively smaller portions of the mixture are recirculated, as will become apparent from the further description which follows. Furthermore, in this embodiment the first trough 12a is used to effect a separation of the mixture of articles based on size and thereafter the next three troughs, 12b-12c, are used to effect separation of the remaining mixture into different groups based on density but wherein each group is of an essentially uniform size.

As shown best in FIG. 16, each trough 12 has an upper portion 13 which is inclined from the inlet end to the outlet end. The porous plate 38 forms the bottom of the inclined trough and the lower portion of the trough 15 forms an air chamber into which the air or gas which is used to fluidize the mixture flows for subsequent distribution through the porous plate 38. As in the case of the embodiments previously described, the porous plate 38 is controlled as to individual sections so as to be able to selectively increase or decrease the air pressure of each section of the porous plate 38 along the length of the trough.

Each trough in turn is supported by the upper supporting framework 145 which in turn is carried by a vertical oscillation means as generally designated at 132. The vertical oscillation means 132 is the same in all respects as that previously described in connection with FIG. 15, and consists of two eccentrically weighted axles which are rotated at the same speed but 180° out of phase by means of the two sprockets 158a and 158b which are driven by a belt 162. The speed of the two sprockets 158a and 158b can be selectively varied and controlled using an electric motor or other similar drive and also the size of the eccentric weights can be selectively varied so as to control both the frequency of the vertical oscillation as well as the magnitude of the vertical oscillations which are imparted to the troughs 12a-12d. Furthermore, as will be appreciated from FIG. 17, all four of the troughs 12a-12d are carried on the same supporting framework 145 (FIG. 15) by means of crossbars 147. Accordingly, all four of troughs 12a-12b will be vertically oscillated at the same frequency and using the same magnitude of vertical oscillation in a simultaneous fashion.

The air or other gas which is used to fluidize each trough 12a-12c is provided by means of two fans 34a and 34b which are driven by motors 35a and 35b, and by the belts 37a and 37b and pulleys 39a and 39b located on the drive shaft of each fan. Air is supplied to the fans 34a and 34b through a large air filter 168, duct 170 and connecting air ducts 172. Each fan 34a and 34b supplies the air for fluidization to two of the troughs. Thus, as shown by way of example, fan 34b is used to fluidize troughs 12a and 12c whereas fan 34c is used to supply air to troughs 12b and 12d. In this fashion, there is an approximate equalization between the air flow requirements of the two fans.

The mixture of articles which is to be separated is loaded into a bin 28 which is located at the input end of the first trough 12a. The articles from bin 28 are fed into the first trough 12a and the mixture is then fluidized to create a material fluidized bed which flows down the slopped incline of the trough 12a toward the outlet end. At the outlet end a stream-splitter 195 separates the material fluidized bed based on the size of the products. Accordingly, in the illustrated embodiment, for example, the smaller sized products are discarded and are output onto the conveyor 176 as schematically represented by arrow 15. The larger sized products which form a layer at the bottom of the material fluidized bed are separated by the stream-splitter 195 and are output onto a conveyor 174 which carries that portion of the mixture for input into the second trough 12b for further separation based on density. As will be appreciated, from this point on in the processing of those products which are input to the second conveyor 12b, all further separation is based on density rather than on size, thereby resulting in various groups of differing density but wherein the articles in each group are of essentially the same size.

Figure 18:
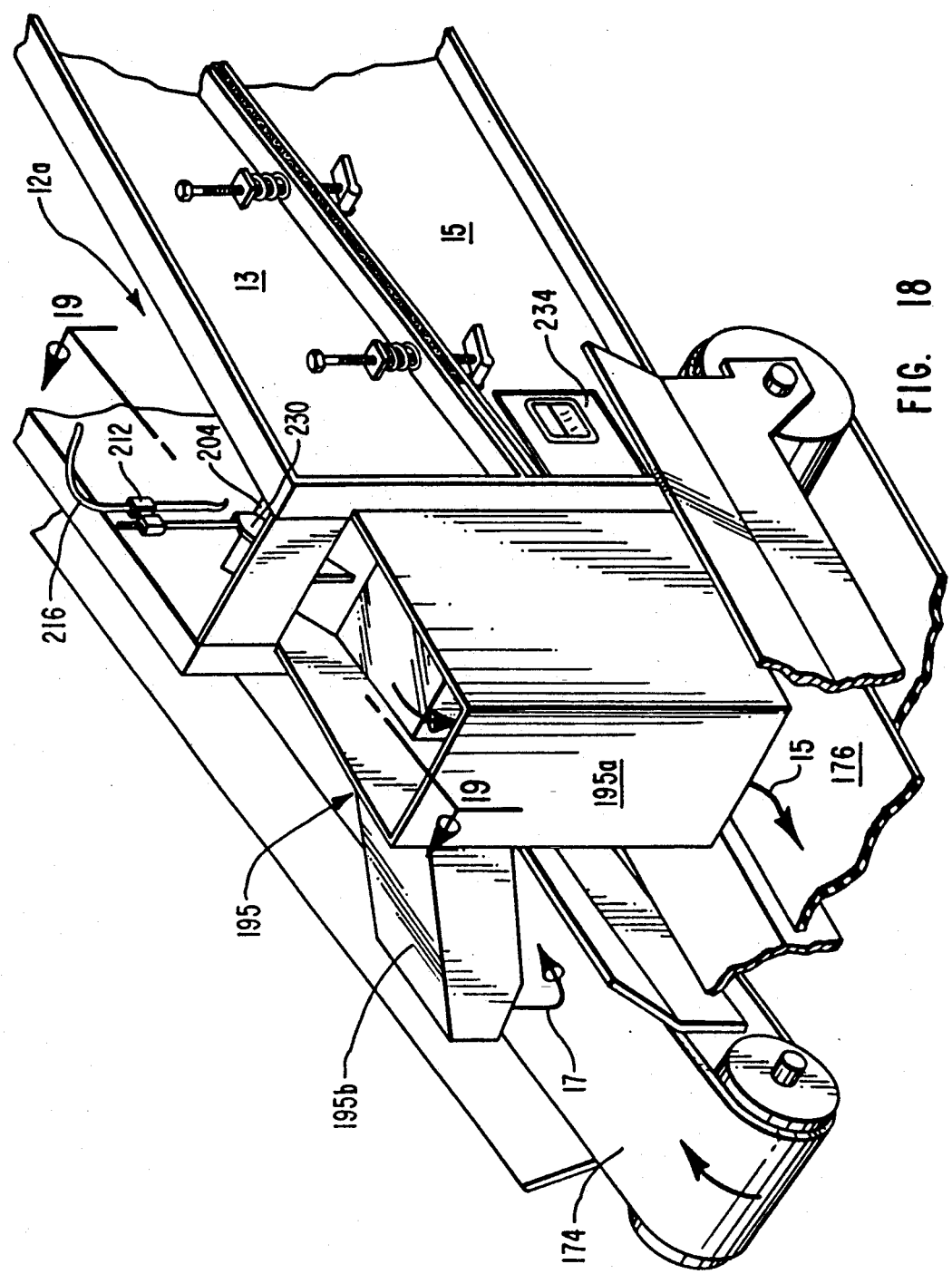
FIG. 18 is an enlarged perspective view that more particularly illustrates the nature of the stream splitter at the end of the first channel in the embodiment of FIGS. 16 and 17.
Figure 19:
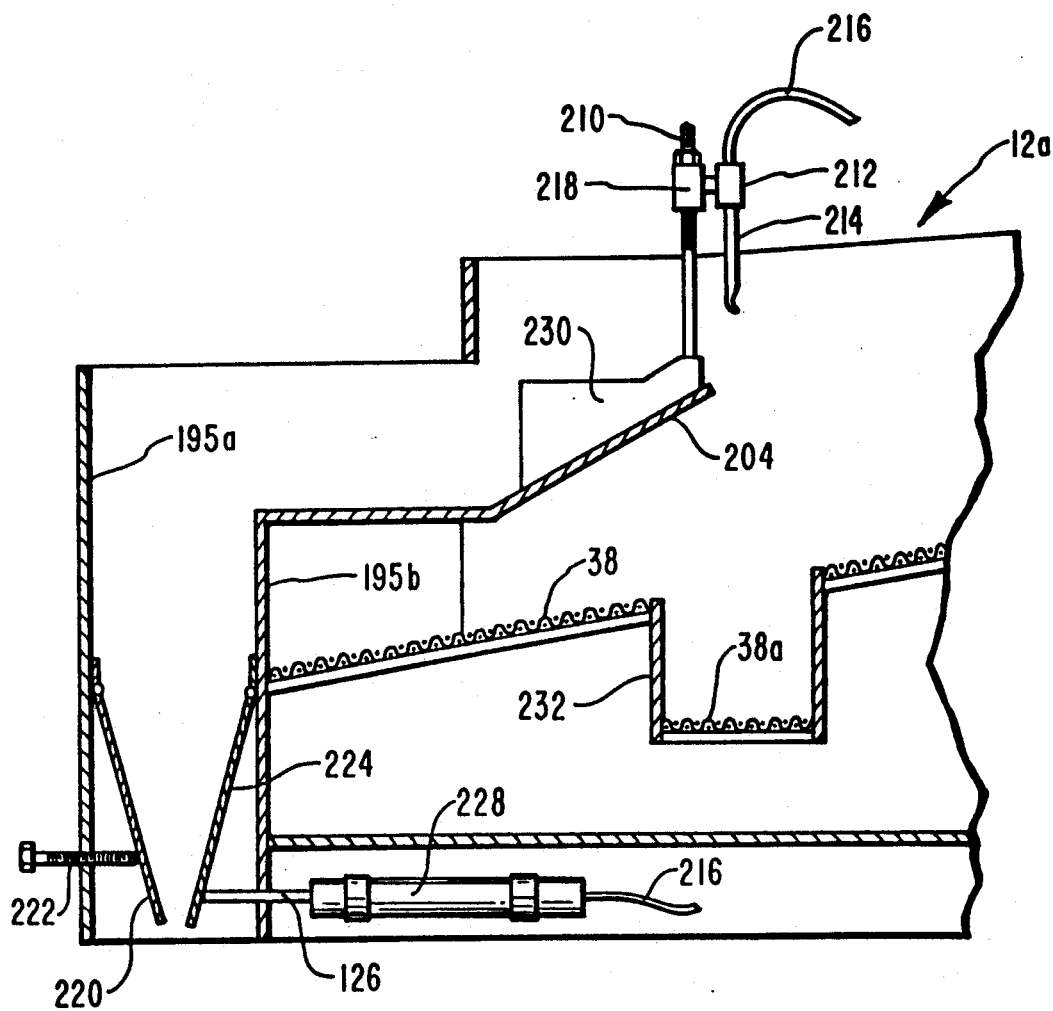
FIG. 19 is a cross-sectional view taken along lines 19—19 in FIG. 18, and more particularly illustrates the structure of the stream-splitter shown in FIG. 18.

As noted, the material fluidized bed is split as it leaves the output end of the inclined trough 12a. For this purpose, the stream-splitter generally designated at 195 (see FIGS. 16 and 17) is situated at the end of the first trough 12a. The particular construction and the manner in which the stream-splitter 195 operates is best illustrated in FIGS. 18 and 19 taken together. As shown in those figures, as the fluidized bed approaches the end of the trough 12a there is an inclined ramp 204 which impinges the fluidized bed and splits the stream into upper and lower portions. The upper portion of the fluidized bed travels up and over the ramp 204 and into a chute 195a which drops the lighter or smaller sized articles onto the conveyer 176 to be discarded. The larger size articles flow beneath the inclined ramp 204 and into the chute 195b which discharges to the side of trough 12a onto the conveyor 174 so that the larger mixture of articles are then carried up conveyor 174 and input into the next trough 12b for further separation based on density. Depending upon the nature of the products, density separation could be applied to the smaller sized products rather than to larger size products by simply reversing the position of the chutes 195a and 195b.

With further reference to FIGS. 18 and 19 taken together, the inclined ramp 204 has a supporting panel 230 placed thereon which carries a post 210 which can be threadably mounted with a member 218 which carries a pneumatic bleeder valve or proximity sensor 212. The pneumatic bleeder valve 212 is of a conventional type which has a flexible, depending arm 214 which is used for sensing the depth of the fluidized bed. An upper tube 216 runs from the bleeder valve 212 to a pneumatic cylinder 228 which is located near the bottom of the trough 12a and which drives a pneumatic ram 126 for purposes of opening or closing an adjustable restriction gate 224. A second, adjustable restriction gate 220 can be adjusted by means of a hand threaded screw 222. Thus, screw 222 is used to provide a coarse adjustment whereas the second gate 224 is finely adjusted in an automatic fashion and responds to the pneumatic bleeder or proximity sensor valve 212. Thus, by adjusting the height of the valve 212 using the threaded fitting 218 on post 210, valve 212 can be used to sense either a higher or lower depth of the fluidized bed. Once the fluidized bed reaches the depending arm 214, it will tend to push the arm 214 until the arm opens the valve 212 which in turn releases the pneumatic fluid through line 216 which is in turn connected to the hydraulic piston 228. The hydraulic piston 228 and valve 212 are therefore in a push-pull relationship so that if the depth of the fluidized bed becomes too great the piston 228 will automatically open the gate 224 to permit increased flow of material so as to lower the depth of the bed. On the other hand, if the depth of the bed is too low so that the arm 214 is not actuated, the pneumatic piston 228 will tend to close the gate 224. Accordingly, the valve 212 and piston 228 will tend to seek a point of equilibrium in order to automatically adjust and maintain a desired depth of the fluidized bed at the outlet end of trough 12a.

As will be further seen from FIGS. 18 and 19, and particularly in reference to FIG. 19, in the first trough 12a the porous plate 38 is interrupted by a drop which is formed as for example at 232. A small section of porous plate 38a is formed at the bottom of the drop 232 so that the fluidized bed is continuously fluidized throughout. However, the drop 232 can be advantageously used to catch rocks or other extremely dense particles which can then be periodically removed through the door 234 (see FIG. 18).

Referring again to FIG. 17, once the larger particles have been separated and input onto conveyor 174 the larger sized particles will travel as schematically represented at arrow 17 and will be input at the upper end of the second trough 12b. From this point on the mixture of articles will be separated based only on density. As the mixture travels in the direction of arrow 17 through the second trough 12b, the mixture is again fluidized to create a material fluidized bed. At the outlet end of the trough 12b a stream-splitter 196 separates the lighter or less dense particles which are formed in an upper layer from the heavier or more dense articles which are formed in the lower layer of the fluidized bed. The more dense or heavier articles are output onto conveyor 180 and as the lighter, less dense articles are returned to a conveyor 178 where they then travel as shown schematically by arrow 21a up conveyor 178 and then through the third trough 12c. At the end of trough 12c the articles are again split by a stream-splitter 196 so that the more dense or heavier articles are output onto conveyor 180 whereas the lighter or less dense articles are returned by means of a conveyor 182 along the direction shown by arrows 21b for processing through the fourth trough 12d.

At the end of trough 12d a stream-splitter 194 splits the fluidized bed into three portions. The heaviest portion is output onto conveyor 180 whereas the lightest portion is output onto conveyor 184 and is discarded as schematically shown by arrow 25. The middle portion of the fluidized bed is returned onto a part of the conveyor 182 and travels as schematically shown by arrow 23 back to the input of trough 12b where that middle portion is then recirculated through all three remaining troughs for further separation based on density.

In the illustrated embodiment, the mixture of articles to be separated could be, for example, corn so that corn of a particular size is first separated by the trough 12a and then further separated based on density in the remaining three troughs 12b-12d in order to separate aflatoxin contaminated product from non-contaminated product based on difference in density. Non-contaminated product, in the illustrated example, will be output on conveyor 180 whereas aflatoxin contaminated product will ultimately be discarded on conveyor 184. It will however be appreciated that as mentioned above the principles of the invention may be used for separating any of a wide variety of different types of products and is not necessarily limited to the example illustrated in FIGS. 16 and 17, which was designed specifically for separation of contaminated from non-contaminated corn product. Thus, if desired, the stream splitters 196 and 194 could be rearranged so as to recirculate heavier rather than lighter articles if so desired.

Figure 20:
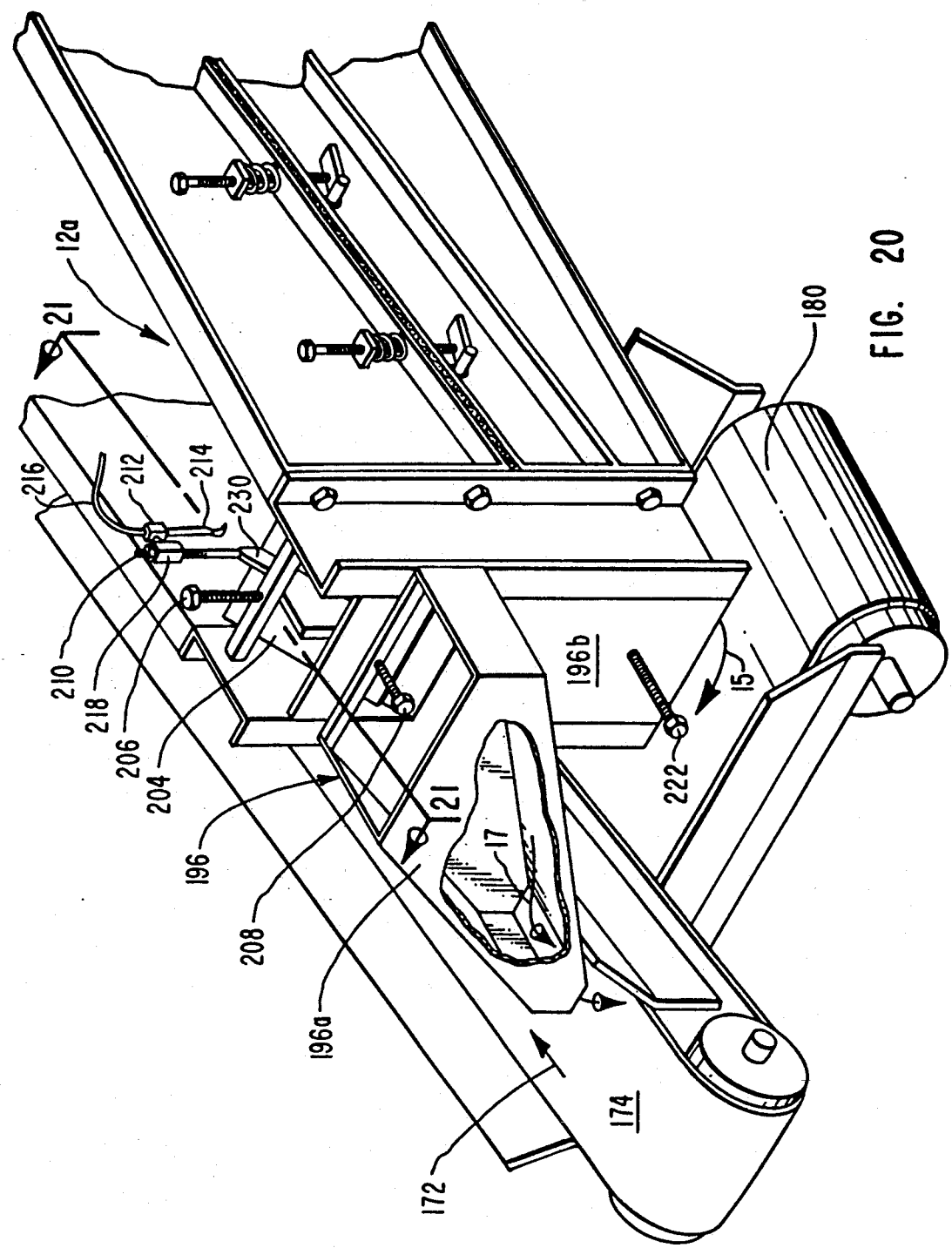
FIG. 20 is an enlarged perspective view which particularly illustrates the nature of the stream-splitter used at the end of the second and third channels.
Figure 21:
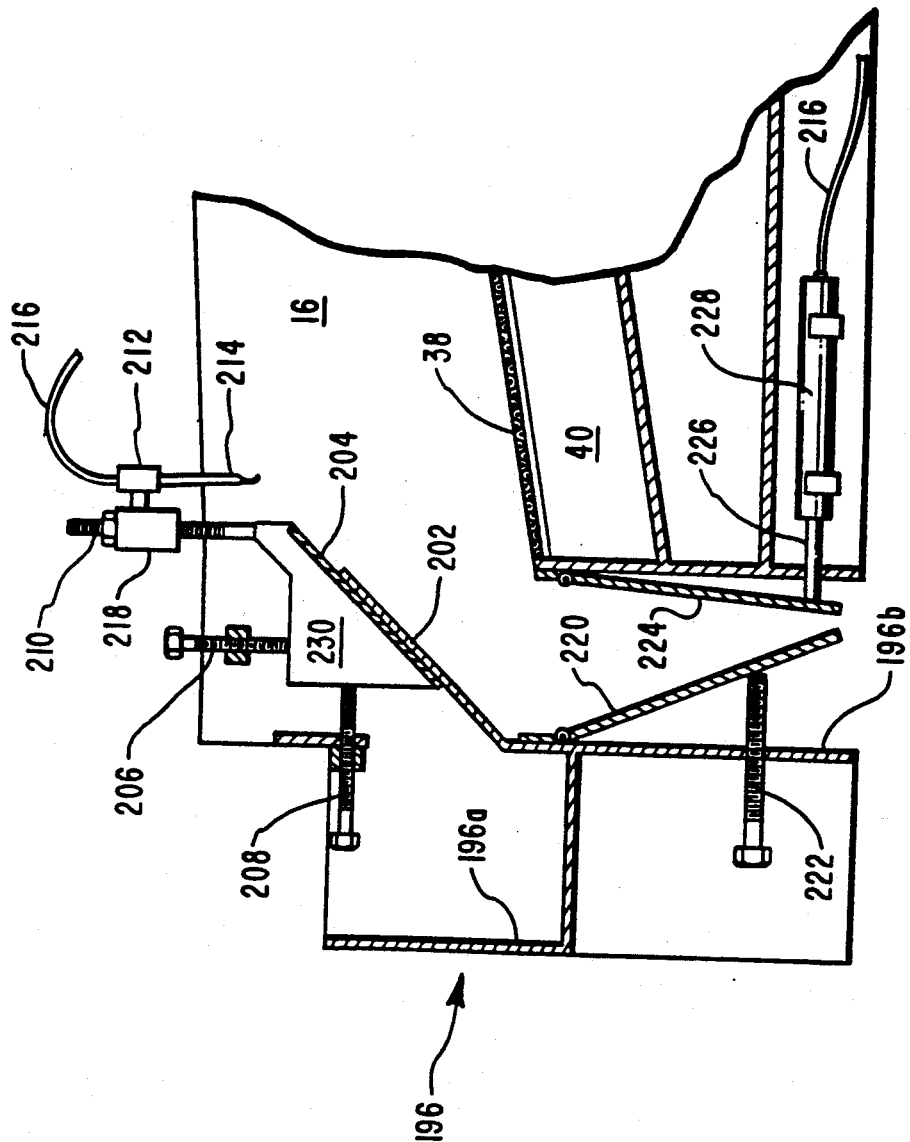
FIG. 21 is a cross-sectional view taken along lines 21—21 of FIG. 20.

The manner in which the fluidized bed is split by the stream-splitters 196 located at the ends of troughs 12b and 12c is best illustrated in FIGS. 20 and 21 taken together. Those stream-splitters operate in a fashion very similar to that previously described in connection with FIGS. 18 and 19, except that the upper portion or less dense product is discharged to the side through the chute 196a as opposed to the heavier or more dense portion of the product, which is discharged through the vertical chute 196b onto the conveyor 180. Stream-splitter 196 also differs from the stream-splitter 195 previously described in that ramp 204 is slidably mounted on a further diagonal ramp 202 so that an initial adjustment with respect to the depth of the fluidized bed can be made by means of the screws 206 and 208 which can be used together to either raise or lower the panel 230 which in turn carries post 210 and the valve 212.

Figure 10:
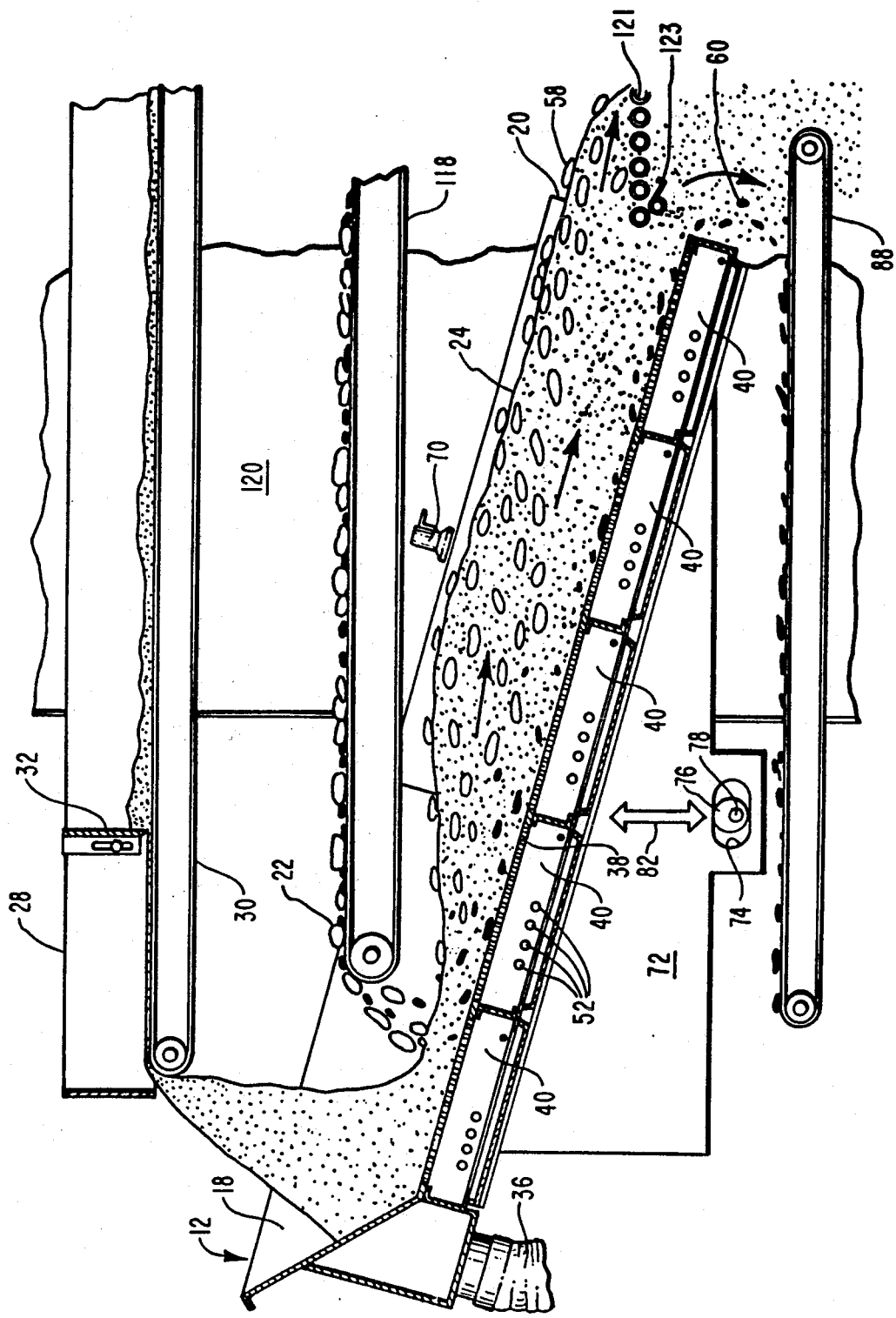
FIG. 10 is a longitudinal sectional view which schematically illustrates another apparatus and method which represents a second embodiment incorporating the teachings of the present invention as applied in connection with fluidized bed medium separation processes.
Figure 22:
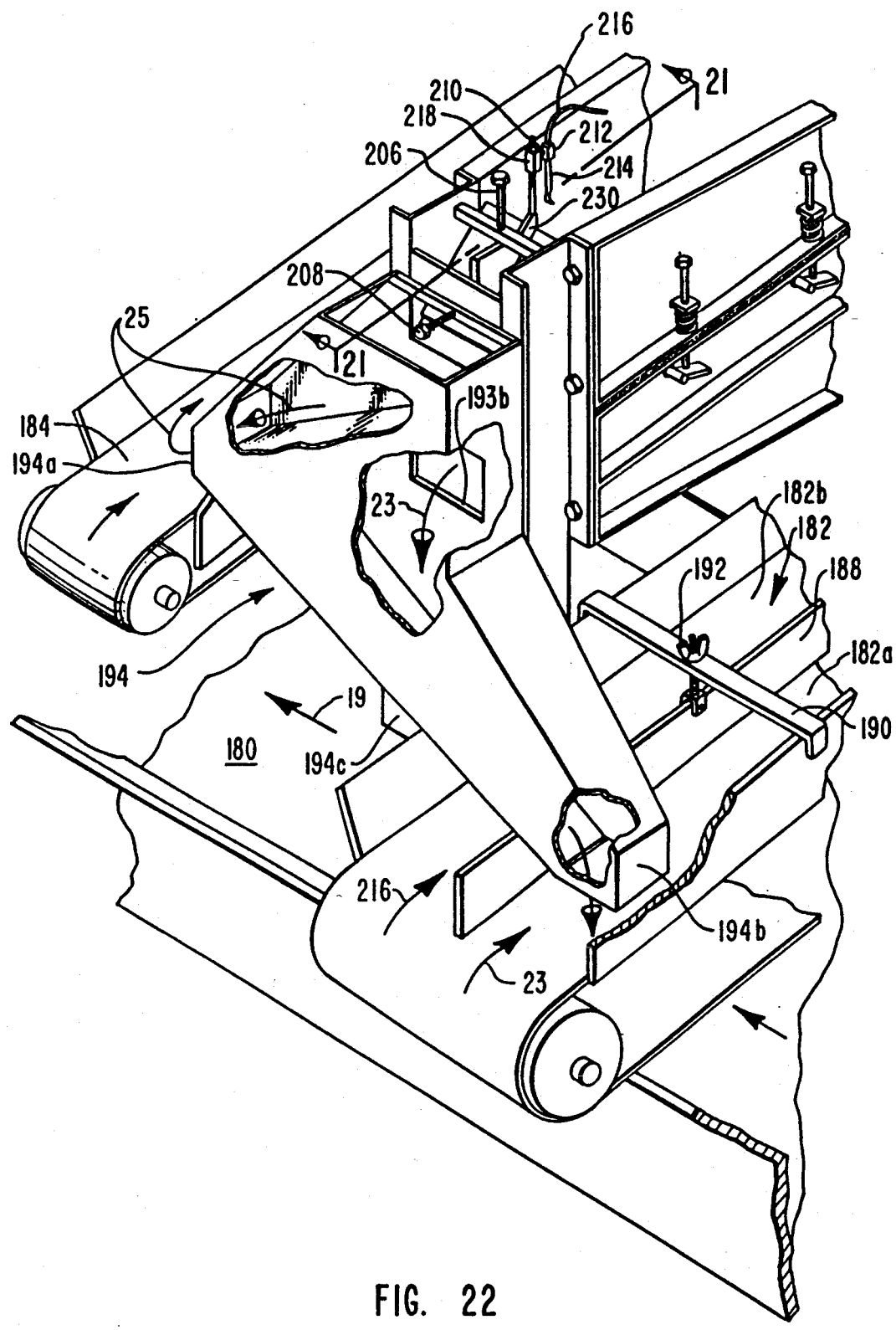
FIG. 22 is a perspective view which illustrates the nature of the stream-splitter used at the end of the fourth channel.
Figure 23:
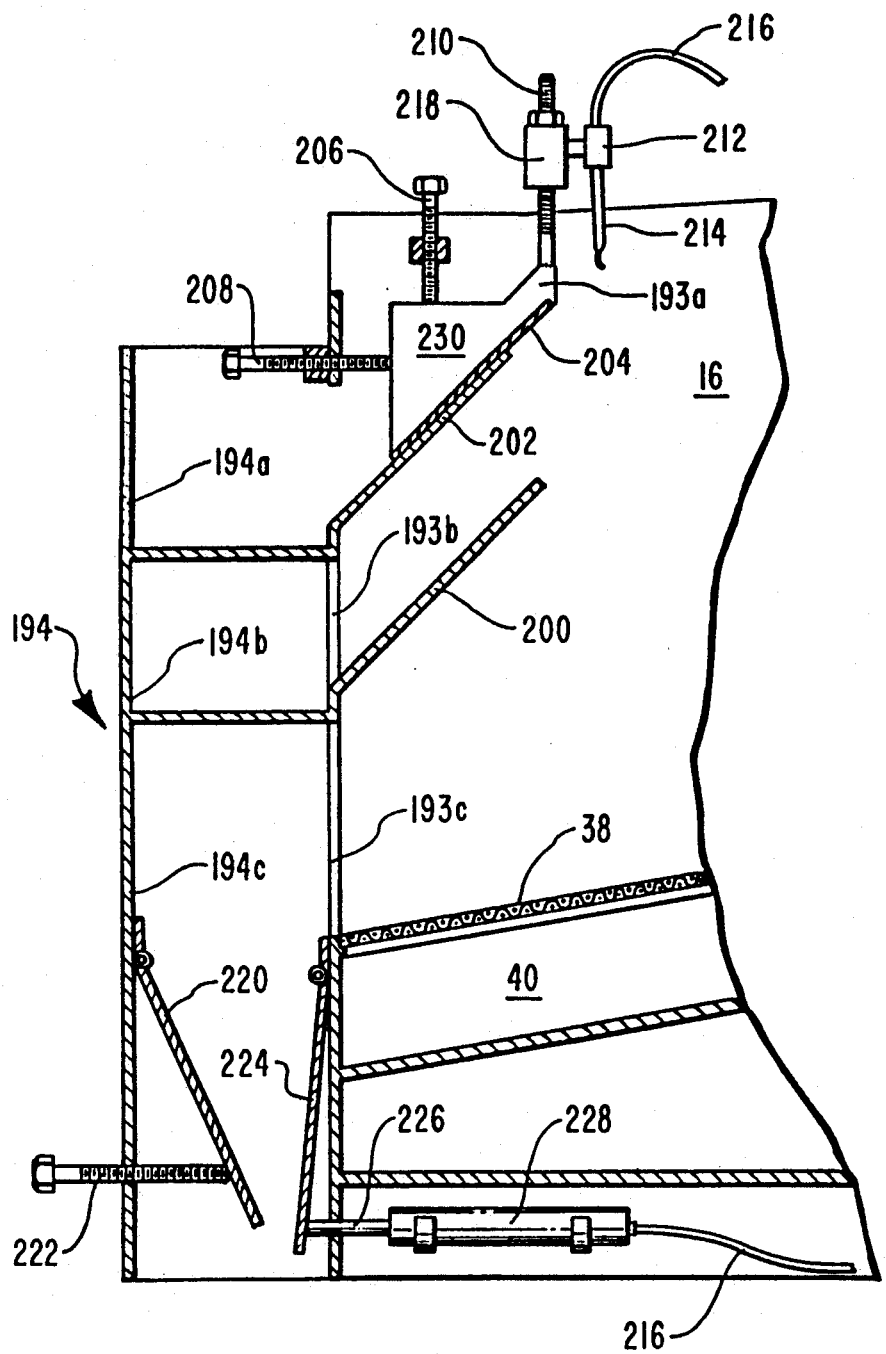
FIG. 23 is a cross-sectional view taken along lines 23—23 of FIG. 22.

The particular construction and operation of the stream-splitter 194 which is located at the end of the last trough 12c is particularly illustrated in FIGS. 22 and 23 taken together. As shown best in that drawing, the upper-most or least dense layer is discharged through chute 194a to the side where it is then discarded as contaminated product on conveyor 184 as schematically shown by arrows 25. The middle layer of the fluidized bed stream is separated by means of a secondary diagonal divider 200 (see FIG. 23) so that the middle layer of the stream is discharged to the opposite side through chute 194b onto the portion 182a of conveyor 182. Conveyor 182, as shown in FIG. 22, is thus divided into two portions by means of a divider 188 which is supported by brackets 190 and wing nuts 192. The portion 182a of conveyor 182 thus carries the middle layer of the fluidized bed stream from the last trough 12c for return to the trough 12b where the middle portion is then subjected to further density separation. The most dense or bottom layer of the fluidized bed stream is discharged through an opening 193c into the chute 194c where it drops downward onto the conveyor 180 where it is collected with the other non-contaminated product In all other respects, stream-splitter 194 is essentially the same as the corresponding parts of stream-splitters 196 and 195 as previously described The embodiment which is schematically illustrated in FIG. 10 includes an inclined trough which is identical to the trough 12 described in connection with the embodiment of FIG. 1 in virtually all respects, including but not limited to the described pneumatic means and the vertical oscillation means. However, rather than utilizing the mixture 22 for purposes of fluidization from which to form the fluidized bed 24, sand or other fine material is input from the medium feed conveyor 30. The medium or sand is then fluidized in the same manner as described in connection with FIG. 1, and the mixture of articles 22 is introduced to the input end 18 of trough 12 so that the articles become entrained in the fluidized bed medium 24 so as to form, for example, float and sink fractions 58 and 60 which are separated by a stream splitter in the form of rollers 121 at the output end 20 of trough 12. The mixture of articles 22 is input from a mixture feed means which may comprise, for example, a separate conveyor 118. A fluidization medium recirculation means is also preferably included, and may comprise, for example, a large drum 120 as schematically illustrated in FIG. 10 and as illustrated and described in further detail in U.S. Pat. No. 4,865,722 incorporated herein by reference.

Significantly, the vertical oscillatory movement which is imparted to the inclined trough 12 of FIG. 10 serves to improve the density uniformity of the fluidized bed medium 24. The improved density uniformity of the fluidized bed 24 permits more effective separation of the articles of different density 58, 60 and permits articles having smaller density differences to be effectively sorted using fluidized bed medium (FBM) processes.

Figure 11:
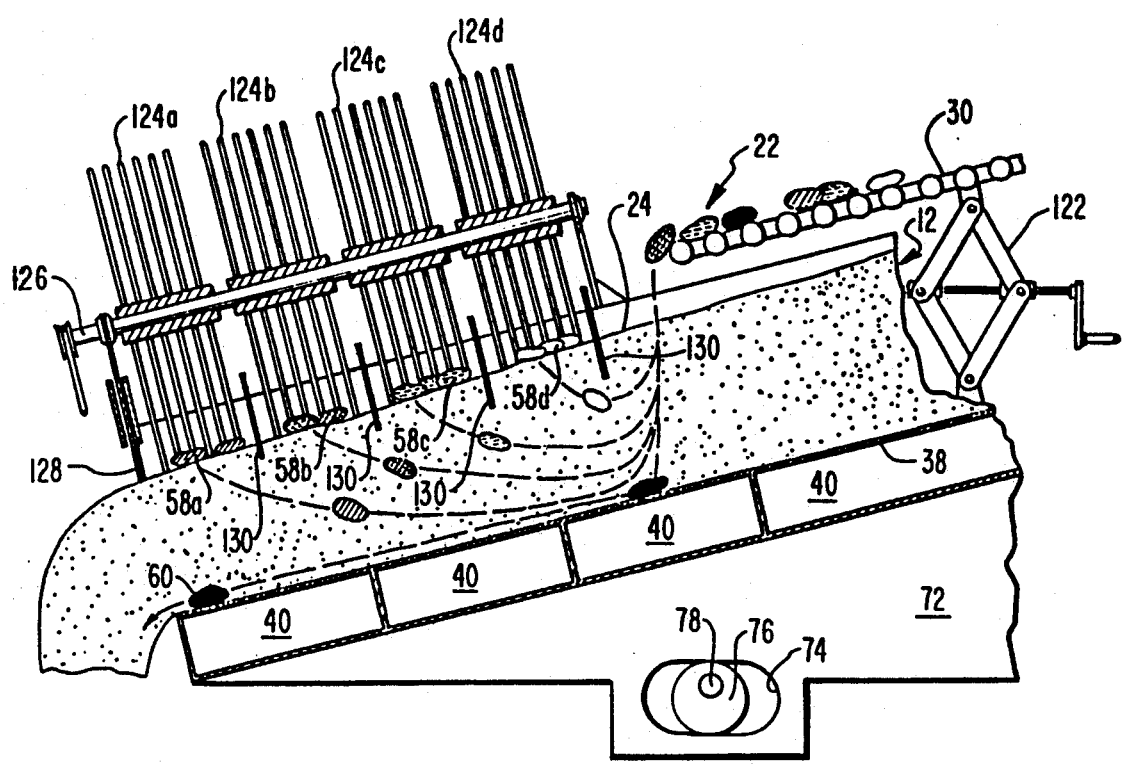
FIG. 11 is a longitudinal sectional view schematically illustrating an apparatus and method which represents yet another embodiment which incorporates the teachings of the present invention.
Figure 12:
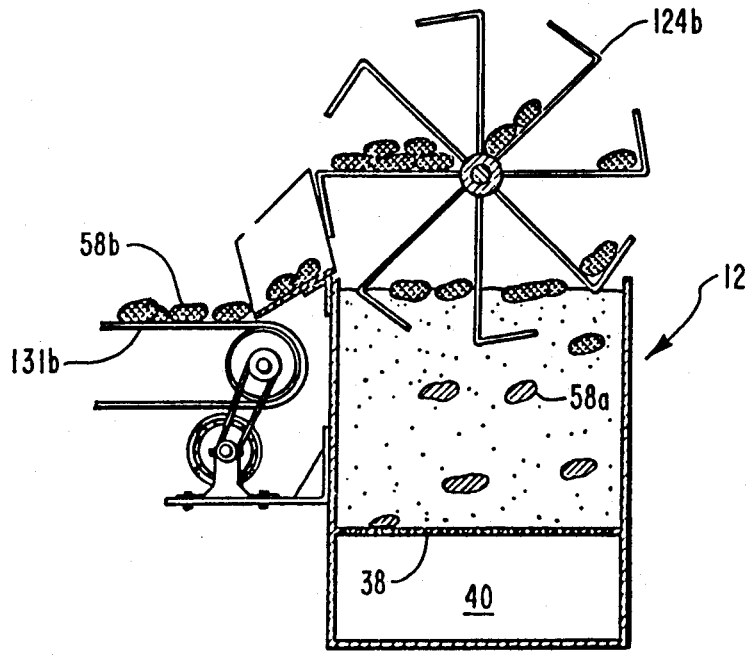
FIG. 12 is a transverse cross-sectional view of the apparatus at FIG. 11 more particularly illustrating the method for removing and off-loading articles which are spatially separated and collected at the top of the fluidized bed medium.

A further illustration of the manner in which the apparatus and method of the present invention may be incorporated into yet another type of fluidized bed medium process is illustrated in FIGS. 11 and 12, taken together. In those figures, once again the inclined trough 12 is essentially identical in connection with the structure of the trough 12 and the pneumatic means and also the means for imparting vertical oscillation to the trough 12. However, in the embodiment shown in those figures, the fluidized bed medium or sand or other fine material which forms the fluidized bed 24 is used as a flotation stream, as illustrated and described in connection with copending U.S. patent application Ser. No. 373,067, incorporated herein by reference. Accordingly, the mixture of articles 22 is introduced into the flotation stream that is formed by the fluidized bed medium 24 at a selected depth so that the articles become entrained in the flotation stream thereby permitting the articles to separate into different density groups as they ascend to the top of the flotation stream or as they sink to the bottom, as illustrated for example by different density groups 58a-58d which become spatially separated and are collected at the top of the flotation stream, as opposed to the group of articles 60 which sink to the bottom of the flotation stream. Baffles 130 may be placed at the top of the trough 12 to assist in grouping the different density articles and spaced tines 124a-124d (see also FIG. 12) may be used to off-load each different group of articles 58a-58d from the top of the flotation stream for placement onto conveyors, as illustrated for example in FIG. 12 at 131b.

The degree of spatial separation may be controlled by either increasing the angle of incline of the trough 12 so as to increase the rate of flow of the flotation stream, or by controlling the rate of flow of the flotation stream by means of the adjustable gate 128 or also by adjusting the height of conveyor 30 by means of scissor jack 122 so as to adjust the depth at which the articles are introduced into the flotation stream. As will be appreciated, articles having lesser density will ascend more quickly than those which have a greater density thereby effecting spacial separation of the articles at the surface of the flotation stream, and the degree of spatial separation will be affected, as indicated above, by how fast the flotation stream is flowing and also by the depth at which the articles are introduced into the flotation stream.

As in the case of the embodiment described in connection with FIG. 10, the wedge-shaped slotted support member 72 which is used in conjunction with the cam 76 and shaft 78 to impart vertical oscillation to the trough 12 results in improved density uniformity of the flotation stream with the same attendant advantages as described above in connection with FIG. 10.

In summary, the present invention provides an improved method and apparatus for efficiently separating and sorting a mixture of articles, as for example agricultural products, when the articles are to be sorted into several different groups based on small density differences. The described apparatus and method for providing a fluidized bed may be used in connection with material fluidized bed (FB) or fluidized bed medium (FBM) processes to effect improved sorting of articles based on small density differences using either process In the case of fluidized bed medium sorting processes, the fluidized bed medium is improved with respect to density uniformity whereas in the case of material fluidized bed processes improved layerization and separation of the bed itself is achieved and the size of the articles which are sorted using the improved FB process of the present invention may be significantly larger than 1-2 mm.

The present invention may be embodied in other specific s forms without departing from its spirit or essential characteristics and the described embodiments are therefore to be considered in all respects only as illustrative and not restrictive. The scope of the invention is, accordingly, indicated by the appended claims rather than by the foregoing description, and all changes which come within the meaning and range of equivalency of the claims are to be embraced within their scope.

What is claimed is:

1. An apparatus for providing a fluidized bed to affect a separation of a mixture of articles having at least a first density and second density that is greater than the first density into separate groups, the apparatus comprising:

an inclined channelization means having input and output ends and otherwise enclosed along the length of the sides and bottom thereof so as to form a continuous channel for containing a fluidized bed flowing under the influence of gravity from said input end to said output end;

medium feed means for supplying to said input end of said channelization means a fluidization medium from which to create the fluidized bed in said channelization means;

pneumatic means for forcing gas upwardly through said fluidization medium in said channelization means to create from said fluidization medium a fluidized bed; and vertical oscillation means for uniformly imparting to said entire channelization means essentially only a vertical oscillatory movement of selected frequency and amplitude so that there is no significant horizontal movement imparted to said channelization means, said vertical oscillation means comprising first adjustable means for selecting the amplitude of vertical oscillation and second adjustable means for selecting the frequency of the vertical oscillation, said first and second means being independently adjustable relative to one another.

2. An apparatus as defined in claim 1 wherein said vertical oscillation means comprises eccentrically weighted rotation means for producing a periodic vertical force by rotating two weights in opposite direction and 180° out of phase with each other.

3. An apparatus as defined in claim 2 wherein said eccentrically weighted rotation means comprises first and second eccentrically weighted axles.

4. An apparatus as defined in claim 2 wherein said vertical oscillation means further comprises a spring-mounted platform on which said channelization means and said eccentrically weighted rotation means are mounted.

5. An apparatus as defined in claim 4 wherein said vertical oscillation means further comprises means attached at opposite ends of said platform for absorbing shock to prevent rocking motion of the platform.

6. An apparatus as defined in claim 3 wherein said eccentrically weighted rotation means comprises means for driving said axles at the same speed but in opposite directions.

7. An apparatus as defined in claim 6 wherein said second adjustable means for selecting the frequency of the vertical oscillation comprises means for selecting the speed of said means for driving said axles.

8. An apparatus as defined in claim 3 wherein said first adjustable means for selecting the amplitude of vertical oscillation comprises means for eccentrically mounting to said axles weights of differing sizes.

9. An apparatus as defined in claim 1 wherein said channelization means comprises a porous plate at the bottom thereof through which said gas is introduced into said channelization means to fluidize said fluidization medium, and further comprising a plurality of flaps attached on an upper side of said porous plate, said flaps each being attached at one edge thereof to said porous plate and being free at an opposite edge thereof and overlapping the attached edge of an adjacent flap, so that said gas flows under said flaps and out from under the free edges thereof.

10. An apparatus as defined in claim 1 wherein said channelization means comprises a porous plate at the bottom thereof through which said gas is introduced into said channelization means to fluidize said fluidization medium, and further comprising a drop means formed in the bottom of said channelization means for catching extremely dense articles.

11. An apparatus as defined in claim 1 wherein said fluidization medium is comprised of said mixture of articles so that vertically separated layers of the articles are formed, with less dense articles being separated into at least one upper layer and wherein said apparatus further comprises means for vertically splitting the fluidized bed at the output end of said channelization means so as to separate the vertical layers.

12. An apparatus as defined in claim 11 wherein said means for vertically splitting said layers comprises adjustable sensing means for selecting a desired depth of the fluidized bed, and for sensing whether the desired depth is being maintained.

13. An apparatus as defined in claim 12 further comprising automatic restriction means responsive to said adjustable sensing means for automatically controlling discharge of at least one layer of said mixture so as to automatically increase the rate of discharge when the depth of the fluidized bed is greater than desired, and so as to automatically decrease the rate of discharge when the depth of the fluidized bed is less than desired.

14. An apparatus for providing a fluidized bed to effect a separation of a mixture of articles having at least a first density and a second density that is greater than the first density into separate groups, the apparatus comprising:

an inclined channelization means having input and output ends and otherwise enclosed along the length of the sides and bottom thereof so as to form a continuous channel for containing a fluidized bed flowing under the influence of gravity from said input end to said output end;

medium feed means for supplying to said input end of said channelization means said mixture of articles from which to create the fluidized bed in said channelization means:

pneumatic means for forcing gas upwardly through said mixture of articles in said channelization means to create from said mixture of articles a fluidized bed; and vertical oscillation means for uniformly imparting to said entire inclined channelization means essentially only a vertical oscillatory movement of selected frequency and amplitude so that there is no significant horizontal movement imparted to said fluidized bed, said vertical oscillation means comprising eccentrically weighted rotation means for producing a periodic vertical force by rotating two eccentric weights at the same speed but in opposite direction and 180° out of phase with each other.

15. An apparatus as defined in claim 14 wherein said weights are adjustable as to size so as to selectively increase or decrease the amplitude of the vertical movement imparted to said channelization means.

16. An apparatus as defined in claim 14 wherein said rotation means comprises means for selectively increasing or decreasing the speed at which said weights are rotatable so as to selectively increase or decrease the frequency of the vertical movement imparted to said channelization means.

17. An apparatus as defined in claim 14 wherein said eccentrically weighted rotation means comprises first and second eccentrically weighted axles.

18. An apparatus as defined in claim 14 wherein said vertical oscillation means further comprises a spring-mounted platform on which said channelization means and said eccentrically weighted rotation means are mounted.

19. An apparatus as defined in claim 18 wherein said vertical oscillation means further comprises means attached at opposite ends of said platform for absorbing shock to prevent rocking motion of the platform.

20. An apparatus as defined in claim 14 wherein said channelization means comprises a porous plate at the bottom thereof through which said gas is introduced into said channelization means to fluidize said mixture of articles, and further comprising a plurality of flaps attached on an upper side of said porous plate, said flaps each being attached at one edge thereof to said porous plate and being free at an opposite edge thereof and overlapping the attached edge of an adjacent flap, so that said gas flows under said flaps and out from under the free edges thereof.

21. An apparatus as defined in claim 14 wherein said channelization means comprises a porous plate at the bottom thereof through which said gas is introduced into said channelization means to fluidize said mixture of articles, and further comprising a drop means formed in the bottom of said channelization means for catching extremely dense articles.

22. An apparatus as defined in claim 14 further comprising means for splitting at least two vertical layers of the fluidized mixture of articles at the output of said channelization means.

23. An apparatus as defined in claim 22 wherein said means for vertically splitting said layers comprises adjustable sensing means for selecting a desired depth of the fluidized bed, and for sensing whether the desired depth is being maintained.

24. An apparatus as defined in claim 23 further comprising automatic restriction means responsive to said adjustable sensing means for automatically controlling discharge of at least one layer of said mixture so as to automatically increase the rate of discharge when the depth of the fluidized bed is greater than desired, and so as to automatically decrease the rate of discharge when the depth of the fluidized bed is less than desired.

25. An apparatus for providing a fluidized bed to effect a separation of a mixture of articles having at least a first density and a second density that is greater than the first density into separate groups, the apparatus comprising:
a plurality of inclined channelization means each having input and output ends and otherwise enclosed along the length of the sides and bottom thereof so as to form a continuous channel for containing a fluidized bed flowing under the influence of gravity from said input end to said output end;
medium feed means for supplying to the input end of at least one said channelization means said mixture of articles from which to create the fluidized bed in said channelization means;
pneumatic means for forcing gas upwardly through said mixture of articles in said channelization means to create from said mixture of articles a fluidized bed;
vertical oscillation means for uniformly imparting to each entire said inclined channelization means essentially only a vertical oscillatory movement of selected frequency and amplitude with no significant horizontal movement so as to create within said fluidized bed a plurality of separate layers each containing articles of different density, said vertical oscillation means comprising first adjustable means for selecting the amplitude of vertical oscillation and second adjustable means for selecting the frequency of the vertical oscillation, said first and second means being independently adjustable relative to one another;
means for returning at least one said layer of said mixture exiting from an output end of at least one said channelization means to the input end of another of said channelization means; and
means for off-loading different layers of said mixture which are vertically separated at the output end of each channelization means.

26. An apparatus as defined in claim 25 wherein said vertical oscillation means comprises eccentrically weighted rotation means for producing a periodic vertical force by rotating two weights in opposite direction and 180° out of phase with each other.

27. An apparatus as defined in claim 26 wherein said eccentrically weighted rotation means comprises first and second eccentrically weighted axles.

28. An apparatus as defined in claim 27 wherein said first adjustable means for selecting the amplitude of vertical oscillation comprises means for eccentrically mounting to said axles weights of differing sizes.

29. An apparatus as defined in claim 27 wherein said eccentrically weighted rotation means comprises means for driving said axles at the same speed but in opposite directions.

30. An apparatus as defined in claim 29 wherein said second adjustable means for selecting the frequency of the vertical oscillation comprises means for selecting the speed of said means for driving said axles.

31. An apparatus as defined in claims 28 or 30 wherein said vertical oscillation means further comprises a spring-mounted platform on which said channelization means and said eccentrically weighted rotation means are mounted.

32. An apparatus as defined in claim 31 wherein said vertical oscillation means further comprises means attached at opposite ends of said platform for absorbing shock to prevent rocking motion of the platform.

33. An apparatus as defined in claim 25 wherein said channelization means comprises a porous plate at the bottom thereof through which said gas is introduced into said channelization means to fluidize said mixture of articles, and further comprising a plurality of flaps attached on an upper side of said porous plate, said flaps each being attached at one edge thereof to said porous plate and being free at an opposite edge thereof and overlapping the attached edge of an adjacent flap, so that said gas flows under said flaps and out from under the free edges thereof.

34. An apparatus as defined in claim 25 wherein said channelization means comprises a porous plate at the bottom thereof through which said gas is introduced into said channelization means to fluidize said mixture of articles, and further comprising a drop means formed in the bottom of said channelization means for catching extremely dense articles.

35. An apparatus as defined in claim 25 further comprising means for splitting at least two vertical layers of the fluidized mixture of articles at the output of said channelization means.

36. An apparatus as defined in claim 35 wherein said means for vertically splitting said layers comprises adjustable sensing means for selecting a desired depth of the fluidized bed, and for sensing whether the desired depth is being maintained.

37. An apparatus as defined in claim 36 further comprising automatic restriction means responsive to said adjustable sensing means for automatically controlling discharge of at least one layer of said mixture so as to automatically increase the rate of discharge when the depth of the fluidized bed is greater than desired, and so as to automatically decrease the rate of discharge when the depth of the fluidized bed is less than desired.

38. A method of providing a fluidized bed to effect a separation of articles having at least a first density and a second density that is greater than the first density into separate groups, comprising the steps of:
supplying to an inclined trough having inlet and outlet ends a fluidization medium from which to produce a fluidized bed flowing uninterrupted under the influence of gravity through the length of said trough;
forcing air upwardly through said fluidization medium in said trough to produce therefrom the fluidized bed;
uniformally imparting to said entire trough essentially only a vertical oscillatory movement of selected frequency and amplitude with no significant horizontal movement imparted to the fluidized bed; and
adjusting at least one of the frequency and amplitude of the vertical oscillatory movement.

39. A method as defined in claim 38 wherein said step of imparting to said trough said vertical oscillatory movement comprises the step of producing a periodic vertical force by rotating two eccentric weights at the same speed but in opposite directions and 180° out of phase with each other.

40. A method as defined in claim 39 wherein said steps of producing said periodic vertical force by rotating said eccentric weights comprises the step of adjusting said speed of rotation 41. A method as defined in claim 39 wherein said step of producing said periodic vertical force by rotating said eccentric weights comprises the step of changing the size of said weights so as to select a desired amplitude of oscillation.

42. A method as defined in claim 38 wherein said fluidization medium is comprised of said mixture of articles so that vertically separated layers of the articles are formed, with less dense articles being separated into at least one upper layer, and wherein said method further comprises the step of splitting the fluidized bed at the output end of said trough so as to separate said layers.

43. A method as defined in claim 38 further comprising the steps of:
selecting a desired depth of the fluidized bed; and
sensing whether the desired depth is being maintained at the outlet end of said trough.

44. A method as defined in claim 43 further comprising the step of:
automatically controlling discharge of at least one layer of said mixture so as to automatically increase the rate of discharge when the depth of the fluidized bed is greater than desired, and so as to automatically decrease the rate of discharge when the depth of the fluidized bed is less than desired.

45. A method of providing a fluidized bed to effect a separation of a mixture of articles having at least a first density and a second density that is greater than the first density into separate groups, comprising the steps of:
supplying to an inclined trough having inlet and outlet ends a fluidization medium from which to produce a fluidized bed flowing uninterrupted under the influence of gravity through the length of said trough;
forcing air upwardly through said fluidization medium in said trough to produce therefrom the fluidized bed; and
uniformly imparting to said entire trough essentially only a vertical oscillatory movement of selected frequency and amplitude with no significant horizontal movement imparted to the fluidized bed by producing a periodic vertical force by rotating two weights at the same speed but in opposite direction and 180° out of phase with each other.

46. A method as defined in claim 45 wherein said steps of producing said periodic vertical force by rotating said eccentric weights comprises the step of adjusting said speed of rotation.

47. A method as defined in claim 46 wherein said step of producing said periodic vertical force by rotating said eccentric weights comprises the step of changing the size of said weights so as to select a desired amplitude of oscillation.

48. A method as defined in claim 47 wherein said step of producing said periodic vertical force by rotating said eccentric weights comprises the step of changing the size of said weights so as to select a desired amplitude of oscillation.

49. A method as defined in claim 48 further comprising the steps of:
selecting a desired depth of the fluidized bed; and
sensing whether the desired depth is being maintained at the outlet end of said trough.

50. A method as defined in claim 49 further comprising the step of:
automatically controlling discharge of at least one layer of said mixture so as to automatically increase the rate of discharge when the depth of the fluidized bed is greater than desired, and so as to automatically decrease the rate of discharge when the depth of the fluidized bed is less than desired.

51. A method of providing a fluidized bed to effect a separation of a mixture of articles having at least a first size and a second size, and having a first density and a second density that is greater than the first density into separate groups, comprising the steps of:
supplying to a first inclined trough having inlet and outlet ends said mixture of articles from which to produce a fluidized bed flowing uninterrupted under the influence of gravity through the length of said first trough;
forcing air upwardly through said mixture of articles in said first trough to produce therefrom the fluidized bed;
uniformly imparting to said entire first trough essentially only a vertical oscillatory movement of selected frequency and amplitude with no significant horizontal movement imparted to the fluidized bed so that said mixture is separated into at least two groups of differing sizes;

returning one of said groups to a second inclined trough having inlet and outlet ends;

forcing air upwardly through said second trough to produce from said returned group a fluidized bed flowing uninterrupted under the influence of gravity through said second trough; and uniformly imparting to said entire second trough essentially only a vertical oscillatory movement of selected frequency and amplitude with no significant horizontal movement imparted to the fluidized bed, so that said returned group of articles is separated into further groups each having a different density but an essentially uniform size in each further group.

52. A method as defined in claim 51 further comprising the step of separately adjusting at least one of the frequency and amplitude of the vertical oscillatory movement.

53. A method as defined in claim 52 wherein said steps of imparting said vertical oscillatory movement to said first and second troughs each comprise the step of producing a periodic vertical force by rotating two eccentric weights at the same speed but in opposite directions and 180° out of phase with each other.

54. A method as defined in claim 53 wherein each said step of producing said periodic vertical force by rotating said eccentric weights comprises the step of adjusting said speed of rotation.

55. A method as defined in claim 53 wherein each said step of producing said periodic vertical force by rotating said eccentric weights comprises the step of changing the size of said weights so as to select a desired amplitude of oscillation.

56. A method as defined in claim 51 further comprising the steps of:
- selecting a desired depth of the fluidized bed; and
- sensing whether the desired depth is being maintained at the outlet end of one of said troughs.

57. A method as defined in claim 56 further comprising the step of:
- automatically controlling discharge of at least one layer of said mixture so as to automatically increase the rate of discharge when the depth of the fluidized bed is greater than desired, and so as to automatically decrease the rate of discharge when the depth of the fluidized bed is less than desired.

* * * * *

UNITED STATES PATENT AND TRADEMARK OFFICE
CERTIFICATE OF CORRECTION

PATENT NO. : 5,244,099
DATED : September 14, 1993
INVENTOR(S) : ARTHUR ZALTZMAN et al.

It is certified that error appears in the above-indentified patent and that said Letters Patent is hereby corrected as shown below:

```
Column 4, line 67, "affect" should be --effect--
Column 6, line 33, after "invention" insert --.--
Column 11, line 14, after "adjust the" insert --amplitude
of the vertical oscillation. The amplitude will--
Column 11, line 43, after "the" insert --frequency of the
vertical oscillations can be selectively--
Column 13, line 14, "desireable" should be --desirable--
Column 13, line 29, after "illustrated" insert --at--
Column 14, line 37, "slopped" should be --sloped--
Column 17, line 14, after "product" insert --.--
Column 17, line 17, after "described" insert --.--
Column 18, line 25, "spacial" should be --spatial--
Column 18, line 46, after "process" insert --.--
Column 18, line 57, "s" should be deleted
Column 18, line 67, "affect" should be --effect--
Column 23, line 30, "uniformally" should be --uniformly--
Column 23, line 46, after "rotation" insert --.--
Column 24, line 22, after "in" insert --the--
```

Signed and Sealed this

Third Day of May, 1994

Attest:

BRUCE LEHMAN

*Attesting Officer*    *Commissioner of Patents and Trademarks*